United States Patent [19]
Corsetto et al.

[11] Patent Number: 4,926,447
[45] Date of Patent: May 15, 1990

[54] PHASE LOCKED LOOP FOR CLOCK EXTRACTION IN GIGABIT RATE DATA COMMUNICATION LINKS

[75] Inventors: Craig Corsetto, Ijamsville, Md.; Tom Hornak, Portola Valley, Calif.; Rasmus Nordby, Horsholm, Fed. Rep. of Germany; Rick C. Walker; Chu Yen, both of Palo Alto, Calif.

[73] Assignee: Hewlett-Packard Company, Palo Alto, Calif.

[21] Appl. No.: 273,302

[22] Filed: Nov. 18, 1988

[51] Int. Cl.$^5$ .............................................. H04L 7/33
[52] U.S. Cl. .................................. 375/120; 370/105.1; 328/155
[58] Field of Search .................. 375/95, 106, 110, 119, 375/120, 105.1; 370/105; 328/63, 74, 151, 155; 360/51

[56] References Cited

U.S. PATENT DOCUMENTS

| | | | |
|---|---|---|---|
| 4,280,099 | 7/1981 | Rottlingourd | 375/119 |
| 4,371,974 | 2/1983 | Dugan | 375/120 |
| 4,400,667 | 8/1983 | Belkin | 375/120 |
| 4,633,488 | 12/1986 | Shaw | 375/110 |
| 4,743,857 | 5/1988 | Childers | 375/120 |
| 4,782,484 | 12/1988 | Limb | 375/106 |

OTHER PUBLICATIONS

"Clock Recovery for A 5 Gbit/s Fibre-Optic System" in *Electronic Letters*, 24th Jun., (1982), vol. 18, No. 13, pp. 547–548.
"Clock Recovery from Random Binary Signals" in *Electronic Letters* 30th Oct., (1975), vol. 11, No. 22, pp. 541–542.
"A Self Correcting Clock Recovery Circuit" by Charles R. Hogge, Jr., in IEEE Transactions on Electron Devices, vol. ED-32, No. 12, Dec., 1975, pp. 2704–2706.

*Primary Examiner*—Benedict V. Safourek
*Assistant Examiner*—T. Bocure

[57] ABSTRACT

A family of Phase Locked Loop circuits and methods for extraction of a clock signal from a digital data stream, for example as received by a data communication link receiver is taught. The circuits of this invention are particularly advantageous in gigabit rate links where the propagation delay of digital circuits is comparable to the duration of a bit time interval and therefore careful matching of clock extracting and data sampling circuit topology is required. In certain embodiments, a frequency detector is included making the structure suitable for use in situations where there is a large fractional difference between the incoming data rate and the free running frequency of the receiver VCO. Such is the case when both the incoming data rate and the receiver VCO frequency are not controlled by a precision element such as a crystal or a Surface Acoustic Wave device.

35 Claims, 20 Drawing Sheets

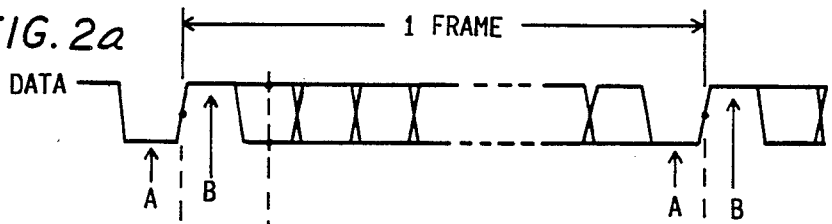
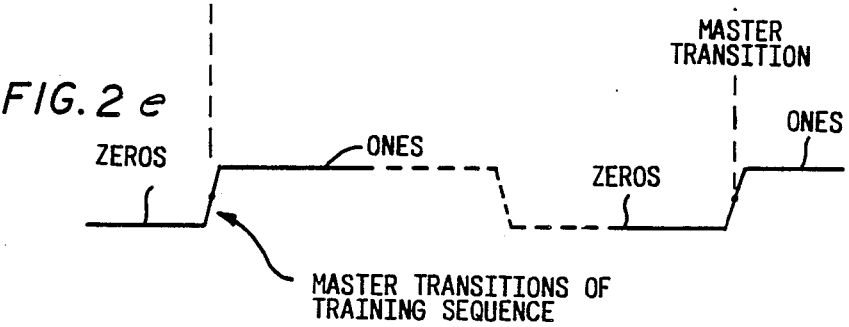

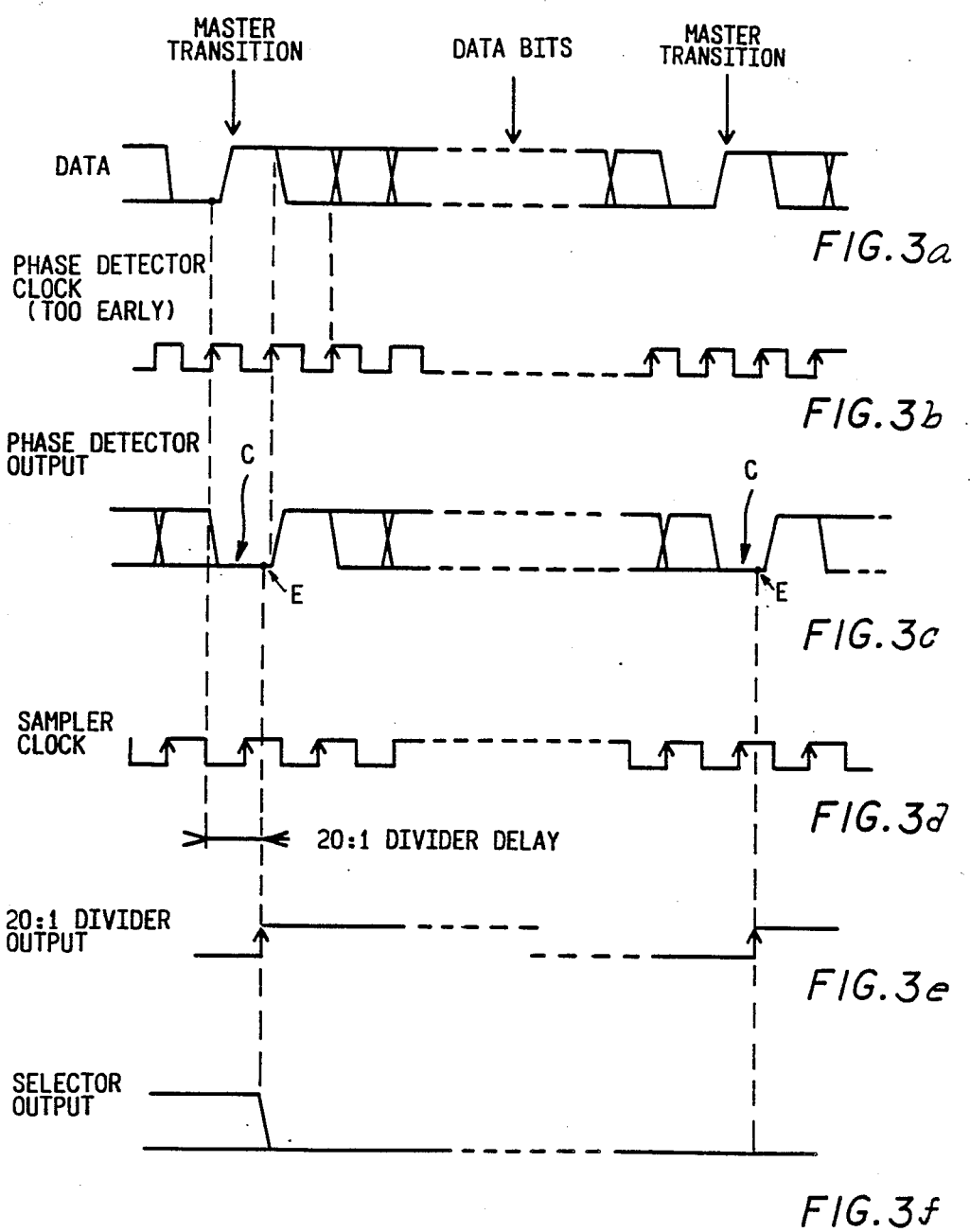

FROM 10:1
FREQUENCY
DIVIDER PART
OF 306

PHASE LOCKED LOOP FOR CLOCK EXTRACTION IN GIGABIT RATE DATA COMMUNICATION LINKS

BACKGROUND OF THE INVENTION

This invention, pertains to phase locked loop circuits for extracting bit rate and frame rate clock signals in a high data rate communication link.

Phase Locked Loops (PLLs) are used in data communication link receivers to extract a clock signal from the incoming data stream. The essentially jitter-free clock signal is then used first to sample and then to regenerate the incoming data stream. This provides a regenerated data stream free from timing jitter introduced on the incoming data by bandwidth limitations of the transmission channel and by noise.

Phase Locked Loops consist usually of a phase detector for comparing the phase of the incoming bit stream with the phase of a locally generated clock, a low pass filter for smoothing the output signal of the phase detector, and a voltage controlled oscillator (VCO) for generating the local clock signal and being frequency controlled by the low pass filter output voltage.

In order to retime the incoming data correctly, with minimum requirements on the signal-to-noise ratio (SNR) of the incoming data, sampling of the incoming data by the local clock signal must occur as close as possible to the center of each consecutive bit time interval (1/bit rate) where the signal usually has its maximum amplitude. As shown in FIGS. 1a through 1c, a data stream as shown in FIG. 1a is transmitted over a communication link, with the received signal appearing as shown in FIG. 1b, due to noise and bandwidth limitations. This received signal from FIG. 1b is to be detected and used to provide a regenerated data stream as shown in FIG. 1c which accurately represents the desired data stream of FIG. 1a. As shown in FIG. 1b, received pulses tend to have their peaks near the center of the bit time interval in which they are transmitted. The phase locked loop, when in lock, guarantees a fixed phase relationship between the incoming bit stream and the locally generated clock. The actual position of the sampling instant relative to the bit time interval is, however, determined by the phase of the clock relative to the incoming data as enforced by the phase detector, and by the phase of the sampling instant relative to the clock which is determined by the operation of the sampling circuit.

In low bit rate communication links the duration of each bit time interval largely exceeds the parasitic propagation delays (or the variations thereof) of the digital circuitry. Consequently, if the sampling instant was set by design to the center of the bit time cell it will essentially stay there over temperature, supply voltage variations, and time. However, in gigabit rate links the propagation delays of the digital circuitry and their variations are very much comparable to the duration of the bit time interval, i.e. 1 nanosecond for a 1 Gigabit per second channel. It is therefore of utmost importance to eliminate the influence of such propagation delays on the position of the sampling instant relative to the bit time interval.

This can be achieved best by implementing the phase detector and the sampling circuit by two closely matched circuits of identical topology and rely on tracking of their propagation delays. Examples of such prior art PLL circuits for use in clock recovery systems in a high data rate communication link are found, for example, in Bentland et al., "Clock Recovery for a 5 Gbit/s Fibre Optic System", *Electronics Letters,* 24 June 1982, Vol. 18, No. 13, pp. 547–548, and C. Hogge, "A Self-Correcting Clock Recovery Circuit," *IEEE Transactions on Electron Devices,* Vol. ED-32, No. 12, December 1985. Bentland describes a circuit in which the transmitted data is grouped into consecutive frames, each consisting of 50 bits of Return to Zero (RZ) format. Bits are transmitted as pulses, with the first bit of each frame always present, as it is devoted only to marking the beginning of the frame and carries no other information. Before start of data communication (i.e. at link power up) a so-called training sequence is transmitted. The training sequence consists only of this reference pulse, with all other bits in the frame being set to zero (i.e. no pulse). On the receiving end, a phase locked loop generates a clock at the frame rate, i.e. at 1/50 of the bit rate, and this clock is phase locked to the incoming reference pulse stream. When lock has occurred, transmission of data is started. The presence of the reference pulse in each frame guarantees a continuing lock from which now both a frame rate as well as a bit rate clock can be derived. In the arrangement described by Bentland et al. the phase detector includes a delay line, with the position of the sampling point within a bit time interval being established by that delay. This requires undesirable adjustment of the delay line, and readjustment over time. Furthermore, the RZ format used in Bentland requires twice the link bandwidth for a given bit rate compared to the non return-to-zero (NRZ) format.

SUMMARY

A family of Phase Locked Loop circuits and methods for extraction of a clock signal from a digital data stream, for example as received by a data communication link receiver is taught. Serial data transmitted over data links in frames very often represent a serialized version of data existing originally in bit-parallel words, such as the data on a computer bus or the like. In this case it is important to transmit to the receiver which of the transmitted serial bits is on the boundary between consecutive words. This invention satisfies this frequent requirement by supplying a frame clock simultaneously with the bit clock. The frame clock can thus be used to properly phase a demultiplexer in order to restore the original bit-parallel words. The circuits of this invention are particularly advantageous in gigabit rate links where the propagation delay of digital circuits is comparable to the duration of a bit time interval and therefore careful matching of clock extracting and data sampling circuit topology is required. In certain embodiments of this invention, a frequency detector is included making the invention suitable for use in situations where there is a large fractional difference between the incoming data rate and the free running frequency of the receiver VCO. Such is the case when both the incoming data rate and the receiver VCO frequency are not controlled by a precision element such as a crystal or a Surface Acoustic Wave device.

BRIEF DESCRIPTION OF THE DRAWINGS

FIG. 1b is a diagram depicting a received signal corresponding to the desired signal of FIG. 1a;

FIG. 2a depicts a serial bit stream transmitted in accordance with the teachings of this invention including a master transition;

FIGS. 2b and 2c depict opposite phase clock signals as used in certain embodiments of this invention;

FIG. 2d depicts a clock signal of frequency equal to the FRAME RATE;

FIG. 2e is a diagram depicting a training sequence sent in accordance with the teachings of this invention;

FIGS. 3a, to 3f are timing diagrams pertaining to the structures of FIGS. 20a and 20b;

DETAILED DESCRIPTION

According to our invention a frame consists of, for example, 20 bit time intervals carrying data bits in NRZ format. Frames are transmitted sequentially, at a FRAME RATE of, for example, 100 MHz. The data bits are transmitted sequentially, at a BIT RATE equal to the number of bit time intervals per frame times FRAME RATE. In the embodiment where each frame includes 20 bit time intervals, and FRAME RATE equals 100 MHz, BIT RATE equals 2000 MHz. The beginning of the frame is marked by a reference transition of a chosen polarity (hereinafter referred to as a "master transition"), rather than a pulse as in Bentland. The master transition shown in FIG. 2a is positive and separates a bit time interval carrying always a logic zero (A in FIG. 2a) from a bit time interval carrying always a logic one (B in FIG. 2a). Data is transmitted in all bit time intervals located between bit time interval pairs forming master transitions.

Before data communication begins (i.e. at link power up) a training sequence is transmitted. The training sequence consists, for example, of 10 bit time intervals of logic zeros followed by 10 bit time intervals of logic ones leading to a single positive transition (the master transition at the beginning of the frame) and a single negative transition for each frame (see FIG. 2e). At the receiving end a phase locked loop generates a clock signal of frame frequency and locks it to the master transition in the training sequence. After lock has been achieved, data transmission begins creating more transitions per frame. However, the continuous presence of the master transition at the frame rate guarantees continuous lock of the loop.

FIRST EMBODIMENT

Figure 20A:
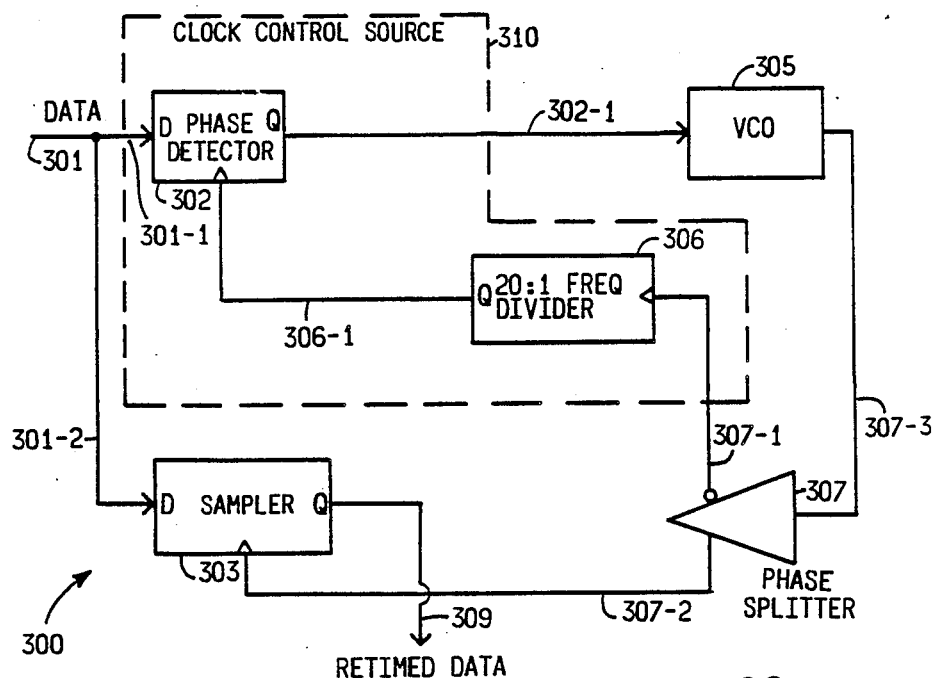
FIGS. 20a and 20b are block diagrams depicting two structures of one embodiment of this invention.

A first embodiment of the invention is shown in the block diagram of FIG. 20a. As shown in FIG. 20a, data recovery circuit 300 receives input data, which includes anomalies due to noise and bandwidth limitations, on input lead 301. This input data is applied to the D input lead of phase detector 302 and sampling circuit 303, which each consist of a D flip flop. Voltage controlled oscillator (VCO) 305 generates a clock signal which is a substantially symmetrical (50% duty cycle) waveform having a frequency equal to BIT RATE. This VCO clock signal is applied to phase splitter 307, which supplies the VCO clock in one polarity (FIG. 2b) to the clock input lead of 20:1 frequency divider 306, and in the opposite polarity (FIG. 2c) to the clock input lead of sampler 303. Both clock waveforms are shown in FIGS. 2b and 2c assuming that both frequency divider 306 and the flip flop of sampler 303 are positive edge triggered and have zero setup time. The 20:1 dividing ratio of frequency divider 306 corresponds to a frame consisting of 20 bit time intervals. The output of divider 306 is a signal having a frequency equal to FRAME RATE. The output signal from divider 306 (FIG. 2d) clocks phase detector 302. Clocking phase detector 302 at FRAME RATE makes it respond to every 20th bit time interval and hold that response for 20 bit time intervals, i.e. the duration of a frame. For the embodiment in FIG. 20a to work properly (i.e. to guarantee sampling of data in the center of the bit time interval), 20:1 frequency divider 306 must have a propagation delay from its clock input to its output negligibly small compared to the bit time interval or exactly equal to an integer multiple of the bit time interval. Or, the propagation delay of frequency divider 306 must be compensated by an element of matching and tracking propagation delay inserted into the clock line of sampler 303. This is difficult to achieve in gigabit rate links and therefore an embodiment easier to implement is shown in FIG. 20b.

Figure 20B:
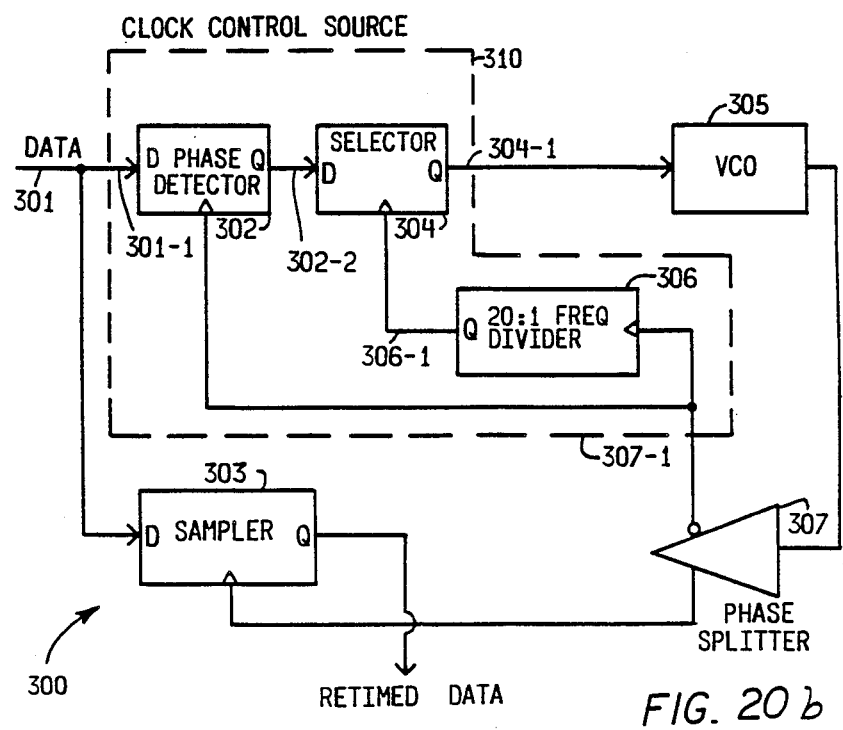

In FIG. 20b, clock input phase detector 302 receives the VCO clock signal (FIG. 2b) directly, instead of its integral fraction supplied by frequency detector 306. In FIG. 20b, the output signal from divider 306 clocks selector 304, which is formed, for example, of a D flip flop having its D input lead connected to the Q output lead of phase detector 302. Selector 304 serves to pick from the Q output lead of phase detector 302 (which is clocked at BIT RATE) only its response to every 20th bit time interval and hold that response for 20 bit time intervals, i.e. the duration of a frame. This arrangement, as opposed to clocking phase detector 302 with the output signal from frequency divider 306 directly and omitting selector 304, makes the timing relationship between the clocking of phase detector 302 and sampler 304 independent of the propagation delay of frequency divider 306. However, even in the arrangement shown in FIG. 20b if the propagation delay of divider 306 were larger than one bit time interval, this propagation delay could cause the selected bit to jump in phase by one bit time interval and the wrong information would be selected. If this happened after lock had been acquired, lock would be lost.

This situation can be described with reference to the timing diagrams of FIGS. 3a through 3f. FIG. 3a depicts a frame having a master transition and a plurality of data bits, as in FIG. 2a. FIG. 3b depicts the clock signal of phase detector flip flop 302, where phase detector flip flop 302 is triggered by a positive edge of the clock signal. As drawn in FIGS. 3a and 3b, the clock signal is early, i.e. it clocks all data bits and the master transition just prior to the transitions. As a result of the clock being slightly early, the output signal from phase detector flip flop 302, as shown in FIG. 3c, during the clock period following the master transition is low, as shown at point C in FIG. 3c. This low level carries the information that the clock is too early, and this information must be held by the rest of the circuit over the whole frame to properly control the VCO, as is described more fully later. Conversely, when the clock signals are too late, i.e. the clock signal transition arrives just after the master transition, the output signal of phase detector 312 during the clock period following the master transition is high. FIG. 3d shows the clock signal applied to sampler 303, which is an inverted form of the clock applied to phase detector 302 and to divider 306. FIG. 3e depicts the output signal of divider 306, which provides a positive transition following every 20th transition of its clock. This positive transition is delayed by the 20:1 divider delay time, as shown in FIG. 3d. The output signal from divider 306 appears as the clock signal applied to selector 304, which in this embodiment is clocked on the positive transition of the output signal from divider 306. Selector 304, when clocked, selects the output signal from phase detector 302, at the instant marked E in FIG. 3c. Selector 304 then holds this level for the following 20 clock cycles. If the propagation delay of divider 306 were larger than a clock cycle, instant E would move to the right in FIG. 3c, and occur after the transition following the master transition, thus causing selector 304 to select incorrect information.

Figure 1A:
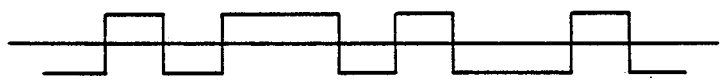
FIG. 1a is a representation of a data stream prior to being sent over a communication link.
Figure 1B:
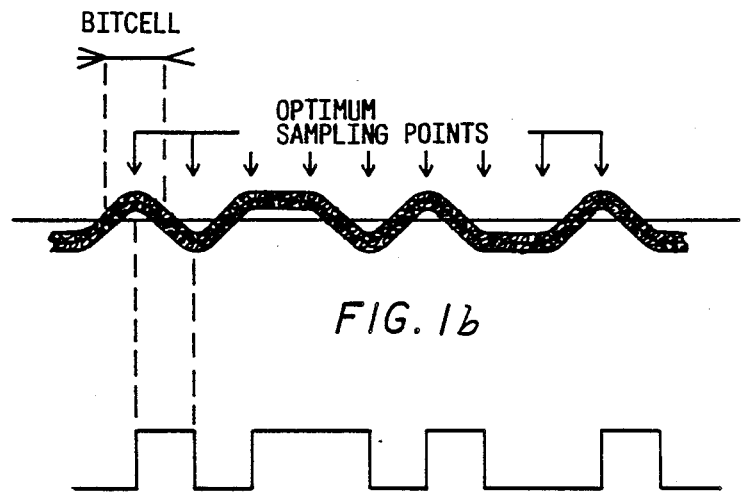
Figure 1C:
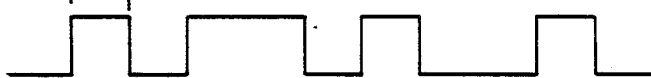
FIG. 1c is a diagram depicting a signal regenerated on the receiving side of a communication link from the received signal of FIG. 1b.
Figure 4:
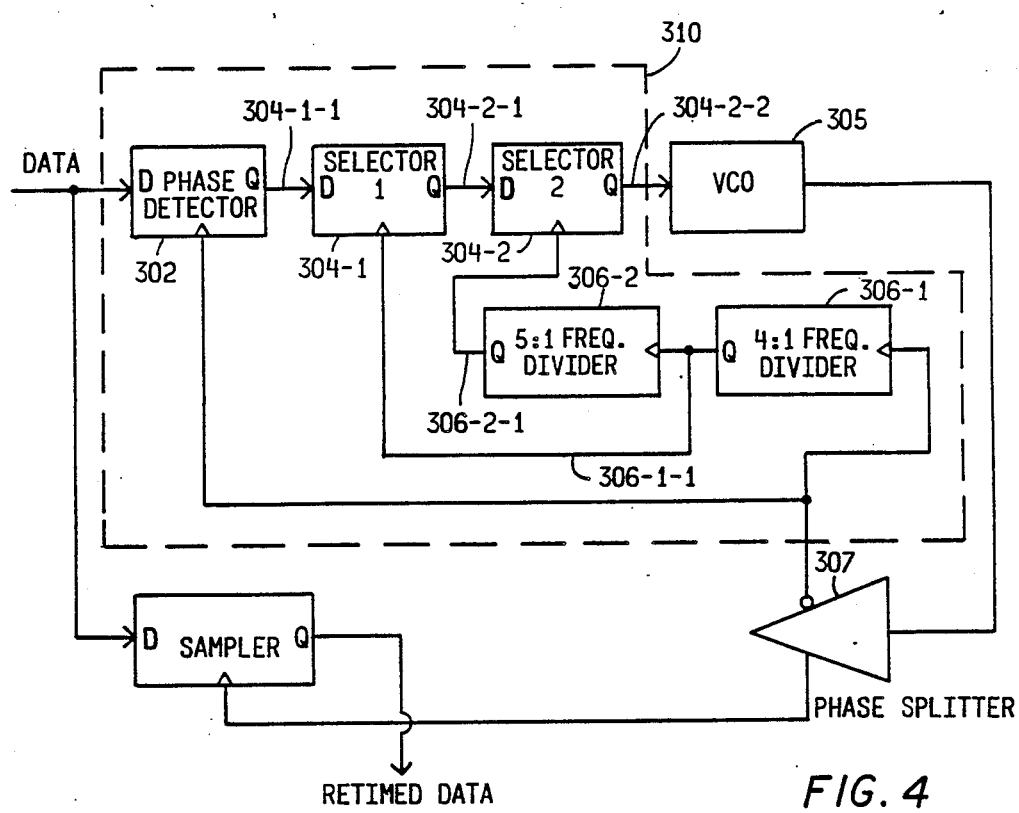
FIG. 4 is a block diagram depicting an alternative embodiment of the structure of FIG. 20b.

In order to alleviate this problem, frequency divider 306 can be built as two dividers, for example as 4:1 divider 306-1 and 5:1 divider 306-2 connected in cascade as shown in the embodiment of FIG. 4. In this embodiment, selector 304 in FIG. 20b is replaced by two selectors 304-1 and 304-2, which may also comprise D flip flops. Selector 304-1 is clocked by 4:1 divider 306-1 and selects every fourth Q output signal of phase detector 302 and holds the selected signal for four bit time intervals. The propagation delay of a 4:1 divider can be made much smaller than the propagation delay of a 20:1 divider and therefore it is much easier to guarantee that selector 304 will pick the correct level, i.e. that point E in FIG. 3c will occur before the transition following the master transition. Selector 304-2 is clocked by 5:1 divider 306-2 and selects every fifth output signal of selector 304-1 (corresponding to every 20th output of phase detector 302) and holds this selected signal over 20 bit time intervals. Because selector 304-1 holds its output signal over 4 bit time intervals, the propagation delay of 5:1 divider 306-2 can now extend up to almost 4 bit time intervals with no danger of selection error.

Frames as shown in FIG. 2a are received on lead 301 (FIG. 20a and 20b) and applied to the D input leads of phase detector 302 and sampler 303. As mentioned before, each frame consists of a master transition signalling the beginning of the frame, and a series of data bits within the frame. The explanation which follows pertains equally to FIG. 20a as well as to FIG. 20b and FIG. 4. For simplicity, reference will be made only to FIG. 20b. Let us assume that selector 304 selects the response of phase detector 302 to a clock edge which, in some consecutive frames, occurs just before the master transition, i.e. within area A in FIG. 2a. As a result, the output signal from selector 304 is a logic zero for the duration of these consecutive frames. If, in contrast, the selected clock edge occurs after the master transition, i.e. within area B in FIG. 2a, the output signal of selector 304 is a logic one for the duration of these frames.

In the embodiment of FIG. 20b, the output signal from selector 304 controls the VCO frequency directly, without the use of a low pass filter. When the selected clock edge occurs in area A in FIG. 2a (and thus the VCO control input signal from the selector is a logic zero) VCO 305 generates a frequency $$\left(f_c - \frac{\Delta f}{2}\right)$$

which is slightly lower than the lowest expected BIT RATE of the received signal on lead 301. In other words, since the BIT RATE of the incoming data is determined by a frequency of an oscillator in the transmitter which has a frequency of, for example, 2GHz±1%, the BIT RATE lies somewhere between the lowest expected BIT RATE 2GHz - 1% and the highest expected BIT RATE 2GHz+1%. If the output signal of selector 304 is low, VCO 305 generates a frequency $$f_c - \frac{\Delta f}{2}$$

which is slightly lower than 2GHz - 1%. Consequently, with the output of selector 304 low, the frequency of the output signal from divider 306 will be always lower than the FRAME RATE frequency of the received data, causing the clock edge to move from area A towards area B. When after a few frame cycles the selected clock edge reaches area B, the output signal from selector 304 changes to a logic one, causing VCO 305 to step up its frequency by Δf and generate a frequency $$\left(f_c + \frac{\Delta f}{2}\right)$$

which is slightly higher than the highest expected incoming BIT RATE of the received signal on lead 301. This causes the selected clock edge to move back from area B towards area A. When the loop is locked, the output signal of VCO 305 constantly alternates between two frequencies, one, $$\left(f_c - \frac{\Delta f}{2}\right)$$

corresponding to the control voltage from selector 304 being a logic zero, the other, $$\left(f_c + \frac{\Delta f}{2}\right)$$

corresponding to the control voltage from selector 304 being a logic one. The phase of the selected clock edge X in FIG. 2b is thus locked to the master transition. With the selected edge aligned with the master transition,, all other bit rate clock edges in FIG. 2b clocking phase detector 302 occur at bit time interval boundaries. Due to the 50% duty cycle of the clock, the positive edges Y in FIG. 2c in the inverted clock which triggers sampler 303 occur in the center of the bit time intervals where the received signal has its maximum amplitude.

A numerical example of this first embodiment follows:

| Assumptions: | |
|---|---|
| Nominal BIT RATE of received data: | 2000 MHz |
| Nominal FRAME RATE: | 100 MHz (20 bit time intervals per frame) |
| BIT RATE tolerance of received data: | ±300 kHz |
| VCO center frequency $f_c$ tolerance | ±300 kHz |
| VCO frequency step Δf: | 2 MHz |
| Time constant of VCO control << frame cycle, i.e. << 10 ns | |
| Received data is free of jitter | |
| Flip flops have zero setup time. | |

Figure 5:
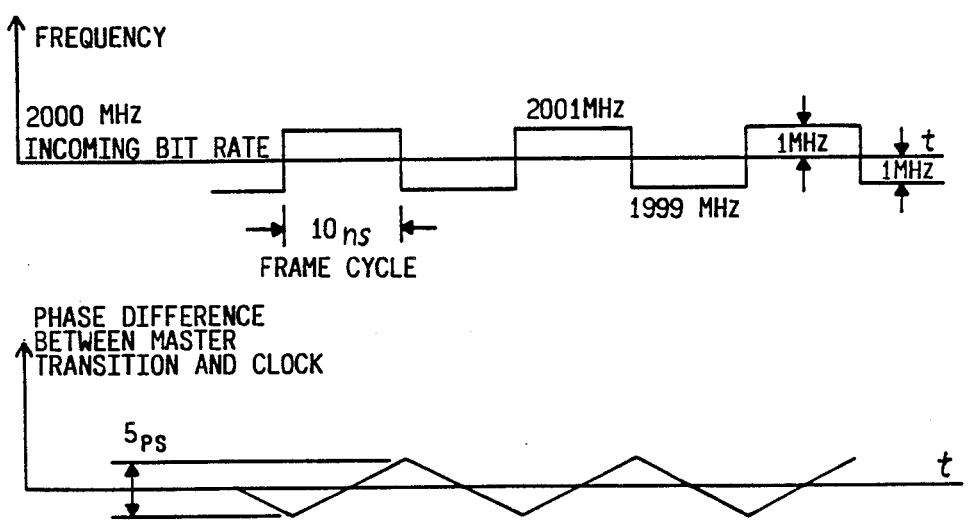
FIG. 5 depicts the operation of VCO 305 of FIGS. 20a, 20b, and 4 in accordance with one embodiment of this invention with a VCO center frequency equal to the bit-rate.

First we will assume that both the received data BIT RATE as well as the VCO center frequency $f_c$ is exactly 2000 MHz, as shown in FIG. 5. With the BIT RATE equal to 2000 MHz and the VCO differing by ±Δf/2=±1 MHz, the VCO will generate 2001 or 1999 cycles for every 2000 bit intervals of incoming data. The phase between the clock signal generated by the VCO and the data will change by ±360 degrees, i.e. by ±1 bit time interval (i.e. by ±1/2000 MHz = ±500 ps) every 2000 bit time intervals. The duration of 2000 bit time intervals at 2000 MHz BIT RATE is 1 μs. Thus, the rate of phase change between data and clock in absolute time is ±500 ps per 1 μs.

The time interval between two subsequent master transitions is 1/100 MHz or 10 ns. Between two consecutive master transitions the phase will change by (±500 ps/μs)*10 ns = ±5 ps. Under the above idealized conditions the VCO control input signal from sampler 304 (FIG. 20b) alternates from frame to frame between logic zero and logic one, the VCO frequency alternates from frame to frame between $$\left(f_c - \frac{\Delta f}{2}\right) = 1999 \text{ MHz}$$

and $$\left(f_c + \frac{\Delta f}{2}\right) = 2001 \text{ MHz}.$$

The selected clock edge will slide relative to the master transition backwards and forwards within a five ps time interval, i.e. from 2.5 ps behind the master transition to 2.5 ps ahead of the master transition, and vice versa.

This variation appears also in the clock signal applied to sampler 303 and translates into a (±2.5 ps/500 ps)*360 = ±1.8 degree phase error amplitude between the sampled point and the center of the bit time interval. This phase error is negligible.

Figure 6:
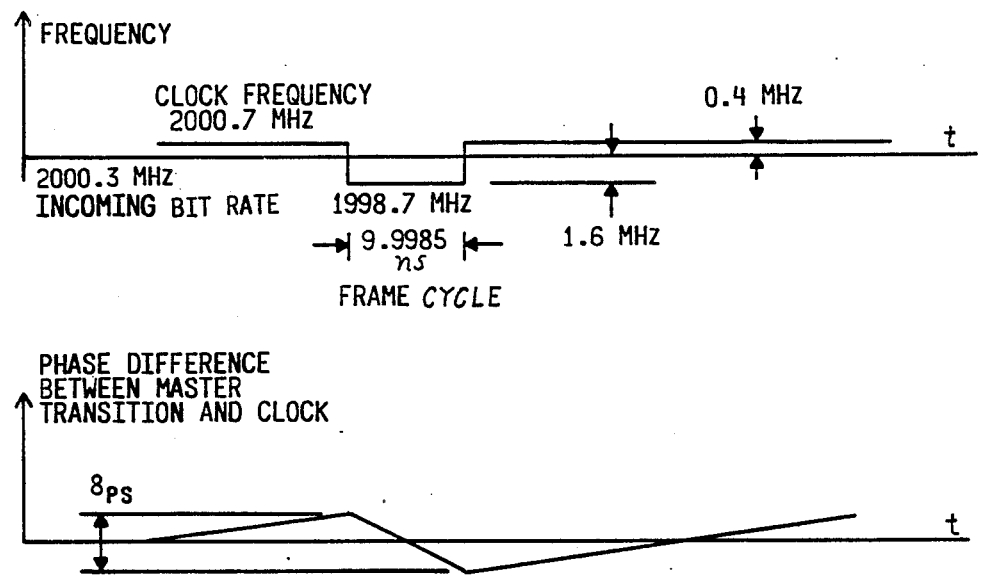
FIG. 6 depicts the operation of VCO 305 of FIGS. 20a, 20b, and 4 in accordance with an embodiment of this invention having a VCO center frequency different than the bit-rate.

If we assume that the incoming data bit rate is at its highest possible value, i.e. at 2000.3 MHz, and that the VCO center frequency $f_c$ is at its lowest possible value, i.e. at $f_c$=1999.7 MHz, the difference between BIT RATE and CLOCK RATE is:

2000.3 MHz − (1999.7 MHz + 1 MHz) = −0.4 MHz and 2000.3 MHz − (1999.7 MHz − 1 MHz) = 1.6 MHz as shown in FIG. 6.

The rate of change of phase of clock versus data will be 1 cycle of 2000.3 MHz in 1 cycle of 0.4 MHz and 1 cycle of 2000.3 MHz in 1 cycle of 1.6 MHz, respectively. These rates correspond to a variation of clock edge vs. master transition timing of 2 ps and 8 ps per frame cycle, respectively. Consequently, on average, the VCO frequency will be 1.6 MHz below the BIT RATE of the received signal for 1 frame cycle and 0.4 MHz above the BIT RATE of the received signal for 4 frame cycles. On average, the clock edge will move with respect to the master transition once by 8 ps in one direction, and four times by 2 ps in the opposite direction. This ±4 ps error amplitude appears also in the clock signal applied to sampler 303 and translates into an insignificant (±4 ps/500 ps)*360=±2.9 degree phase error amplitude between the sampled point and the center of the bit interval.

If now phase detector 302 (FIG. 20b) has a non-zero setup time, the position of the selected clock edge vs. the master transition is shifted by this setup time and will differ from that shown in FIG. 2. However, if sampler 303 has the same setup time as phase detector 302 the sampling point is still in the center of the bit time interval since the two setup times cancel.

Hysteresis of phase detector 302 adds to the phase error amplitude between the selected clock edge and the master transition. Sampler 303, being matched to phase detector 303, will likely have the same hysteresis, however, there is no cancellation. The hysteresis of the sampler 303 adds to the phase error amplitude even further. Fortunately, the hysteresis of high speed flip flops is typically in the picosecond range.

The above described mechanism of maintaining lock assumed that the selected clock edge occurs in the vicinity of the master transition and not near a data bit transition. This is, of course, not guaranteed at the beginning of communication when correct lock has not yet been acquired. The training sequence (which is transmitted before data transmission can begin) contains therefore only the master transition and a single transition of opposite polarity to the master transition near the center of the frame as shown in FIG. 2d. This guarantees correct lock regardless of the initial phase of the selected clock edge with respect to the master transition.

The worst case lock acquisition time occurs when the incoming data BIT RATE and the VCO center frequency fc are at their respective opposite tolerance extremes. In the present example this corresponds to an incoming data BIT RATE of 2000.3 MHz and a VCO center frequency of $f_c$=1999.7 MHz or vice versa. The corresponding rates of phase change between the master transition as described above and the selected clock edge is 2 ps and −8 ps per frame cycle as described above. In the worst case, after link power up, the selected clock edge occurs near the "wrong" transition in the training sequence (i.e. a half a frame cycle away from the master transition) and in the "wrong" half of the frame, where the rate of phase change is the smaller of the two rates. In the present example the selected clock edge must cross half a frame cycle, i.e. travel 5 ns at a rate of 2 ps per frame. The lock aquisition time would be 5 ns/(2 ps per frame)=2500 frames, or, approximately 2500 frames * (10 ns per frame)=25 μs.

Figure 7:
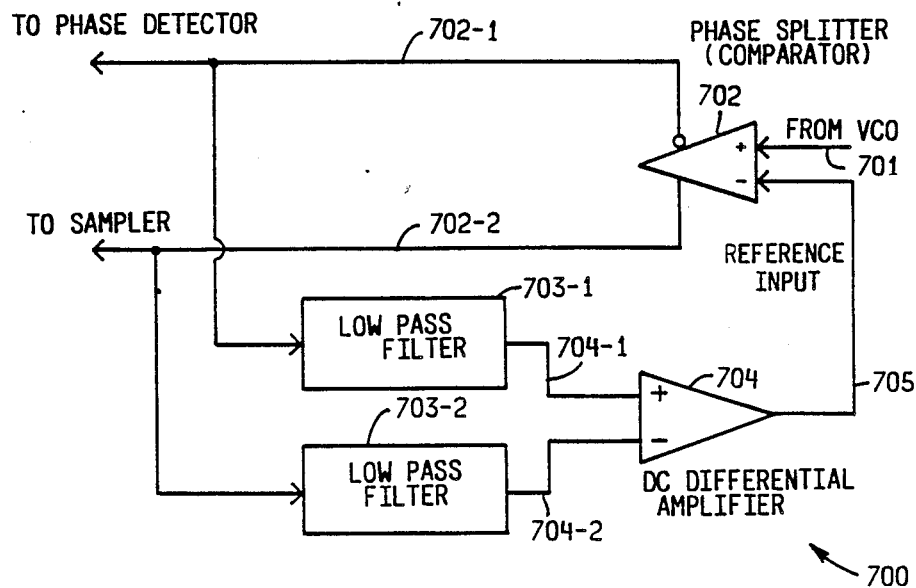
FIG. 7 is a block diagram of one embodiment of a phase splitter and duty cycle control circuit suitable for use as replacement to phase splitter 307 of FIGS. 20a, 20b, and 4.

If the duty cycle of the clock supplied to phase detector 302 and sampler 303 deviates from 50%, this deviation proportionally misplaces the sampling point from the center of the bit time interval. One embodiment of this invention alleviates this problem by including duty cycle control circuit 700 of FIG. 7, in place of phase splitter 307 in FIG. 20b. As shown in FIG. 7, duty cycle control circuit 700 includes low pass filters 703-1; 703-2 and dc differential amplifier 704. Low pass filters 703-1; 703-2 are each connected to one of the two complementary output leads of phase splitter 702, and generate the dc components of the clock signals applied to phase detector 302 and sampler 303 (FIG. 20b), respectively. The two dc components are subtracted by dc differential amplifier 704 to provide a reference signal which is applied to the reference input lead of phase splitter 702. This voltage on the reference input lead of phase splitter 702 controls the input threshold of phase splitter 702. With the VCO output voltage close to a sinusoid, varying the input threshold of phase splitter 702 changes the duty cycle of the output signal from phase splitter 702.

The operation of duty cycle control circuit 700 of FIG. 7 is described by the following equations:

$$V_{703-1} = V_0 + p * V_1$$

and $$V_{703-2} = V_0 + (1 - p) * V_1$$

where $V_{703-1}$ = the dc component of the output signal of low pass filter 703-1;

$V_{703-2}$ = the dc component of the output signal of low pass filter 703-2;

$V_0$ = the voltage associated with the logic zero level of the output signals of phase splitter 702;

$V_1$ = the voltage associated with the logic one level of the output signals of phase splitter 702;

$p$ = the duty cycle of the output signal of phase splitter 702 which is applied to the phase detector and low pass filter 703-1; and $(1 - p)$ = the duty cycle of the output signal from phase splitter 702 which is applied to the sampler and to low pass filter 703-2.

Duty cycle control circuit 700 changes p to keep the two dc components $V_{703-1}$; $V_{703-2}$ equal such that p is kept at 50%. It is desired to provide that differential amplifier 704 have a negligible input offset voltage (typically less than 1% of $V_1-V_0$).

Figure 8:
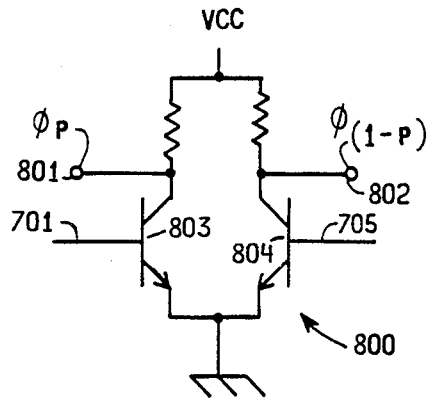
FIG. 8 is a schematic diagram of one embodiment of a phase splitter suitable for use as phase splitter 702 of FIG. 7.

One embodiment of phase splitter 702 of FIG. 7 is shown in the schematic diagram of FIG. 8. Comparator 800 includes an emitter coupled transistor pair 803, 804 with the base of transistor 803 driven by the VCO output signal from lead 701, and the base of transistor 804 driven by the dc differential amplifier output signal on lead 705. The two complementary clock signals $\phi_p$ (phase splitter) and $\phi_{(1-p)}$ (sampler) are taken from the collectors of transistors 803, 804, respectively.

The embodiments described thus far provide a number of distinct advantages over the prior art. Variations in logic circuit propagation delay cancel and do not change the optimum position of the sampling point within the bit time interval. There are no critical delay elements in the circuit which require adjustment. In contrast to the prior art, these embodiments do not use an analog phase detector and/or loop filter, thereby minimizing the number of critical analog circuit elements. These embodiments provide an essentially zero static (average) error in sampling point position vs. frequency variations without the customary high dc gain in the loop and the related problems of loop stability. See for example, Floyd M. Gardner, Phase Lock Techniques, 2nd ed., John Wiley and Sons, Chapters 2 and 4.

Disadvantages:

1. The sampling point timing jitter is higher than customary because it includes the phase error amplitude resulting from the operation of the loop.

2. The loop requires a VCO which can be quickly switched between two frequencies without disturbing the phase continuity of the oscillation.

As long as the loop is not equipped with a frequency detector, as described later with regard to certain embodiments of this invention, there are further disadvantages:

3. The two alternating VCO frequencies $$\left(f_c + \frac{\Delta f}{2}\right) \text{and} \left(f_c - \frac{\Delta f}{2}\right)$$

must straddle the incoming data rate. However, the two alternating frequencies must also be close to the incoming data rate to avoid large clock phase error amplitudes. This requires a tight tolerance of the center frequency $f_c$ of the VCO, and, of course, a tight tolerance of the incoming data rate.

4. In the worst case, lock aquisition can require many frames worth of time. This makes the loop not very suitable for applications in which a receiver must, in quick succession, receive data from more than one transmitter.

SECOND EMBODIMENT

As shown in FIGS. 5 and 6, in the first embodiment the transition time of the VCO frequency control signal from phase detector 302 in FIG. 20a and from selector 304 in FIGS. 20b and 4 must be small compared to the period of a frame cycle. In addition, the fast change in VCO frequency must cause minimum disturbance in the VCO phase continuity and, with no frequency detector, the center frequency of the VCO must be tightly controlled. VCOs satisfying all the above conditions are complex and expensive.

Figure 9:
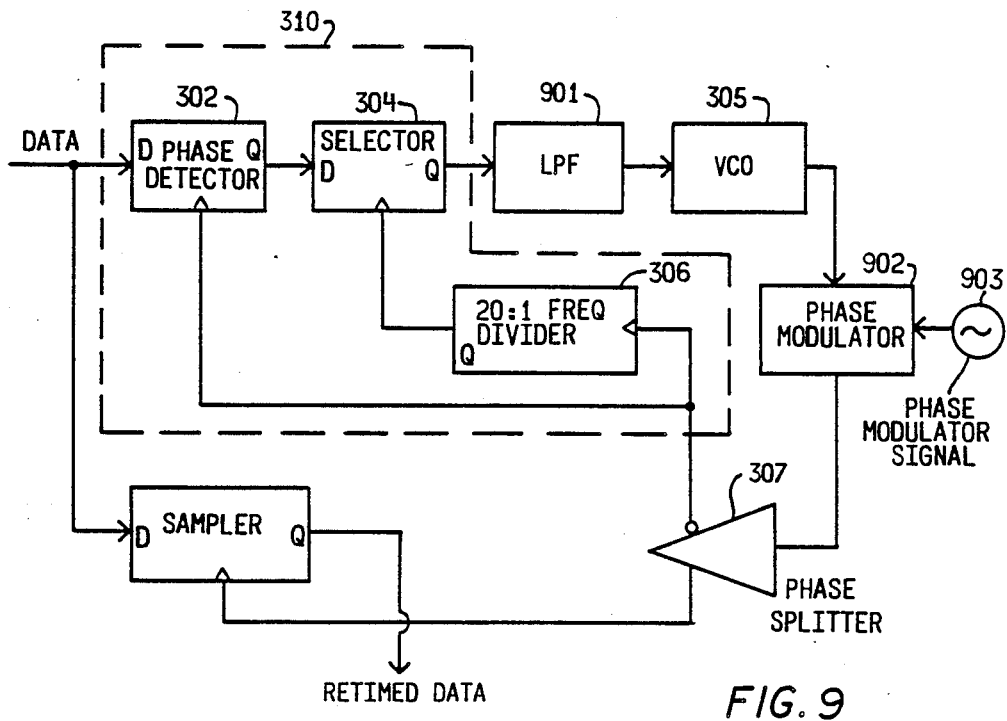
FIG. 9 is a block diagram of one embodiment of this invention which utilizes a low pass filter to filter the control signal applied to the VCO and which utilizes a phase modulator in the clock signal path.

The second embodiment now described obviates the need for fast frequency control of the VCO. For simplicity the embodiment of FIG. 9 is shown with one selector 304 only, as previously described with regard to the embodiment of FIG. 20b. Alternatively, the embodiment of FIG. 9 can be implemented by omitting selector 304 and inserting frequency divider 306 into the clock lead of phase detector 302 as shown in FIG. 20a or by replacing selector 304 with two selectors 304-1; 304-2, as described above with regard to the embodiment of FIG. 4.

The embodiment of FIG. 9 differs from the embodiments of FIGS. 20a, 20b, and 4 by including low pass filter 901 connected between the output of selector 304 and the control input lead of VCO 305, and by including phase modulator 902 which receives a phase modulating ("dithering") signal from phase modulator signal source 903. This dithering signal serves to phase modulate ("dither") the output signal from VCO 305, with the phase modulated signal applied via phase splitter 307 to frequency divider 306 and to phase detector 302 and sampler 303. Phase detector 302 converts the phase modulation into a phase error dependent duty cycle of selector 304 output signal. Low pass filter 901 conveys to the control input lead of VCO 305 only a slowly changing dc component of the output signal from selector 304, allowing phase continuity of the output signal of VCO 305 as VCO 305 changes frequency only slowly. Phase modulator 902 and its driving signal are chosen such that the resulting phase modulation of the output signal of VCO 305 does not exceed a few percent of a bit time interval and thus does not interfere with the operation of frequency divider 306 and selector 304. The phase modulating signal waveform must have an approximately uniform amplitude distribution in order to generate all phases within the peak-to-peak range of the phase modulation with approximately uniform occurrence rate. The phase modulating signal waveform can be, for example, a sinusoid. The frequency, $F_m$, of the phase modulating signal must lie above the pass band of low pass filter 901 and must not be close to a harmonic or a low order subharmonic of the FRAME RATE. If $F_m$ were within the passband of low pass filter 901, the output signal of the filter would phase modulate the VCO to cancel the modulation caused by modulator 902. The clock driving phase detector 302 would not be phase modulated as desired and the purpose of the embodiment of FIG. 9 would not be achieved.

If $F_m$ were a harmonic of the FRAME RATE, the phase of the selected clock edge vs. the master transition would be the same in every frame, and there would again be no desired phase modulation. This is because with $F_m$ equal to a multiple of the FRAME RATE the instantaneous value of the phase modulating signal is the same at every master transition.

If $F_m$ were an Nth subharmonic of the FRAME RATE, the phase of the selected clock edge vs. the master transition would assume only N discrete values. If N were a small number, there would not be enough resolution in the selector output duty cycle to provide a sufficiently accurate indication of the phase error between the master transition and the center position of the clock edge.

Figure 10:
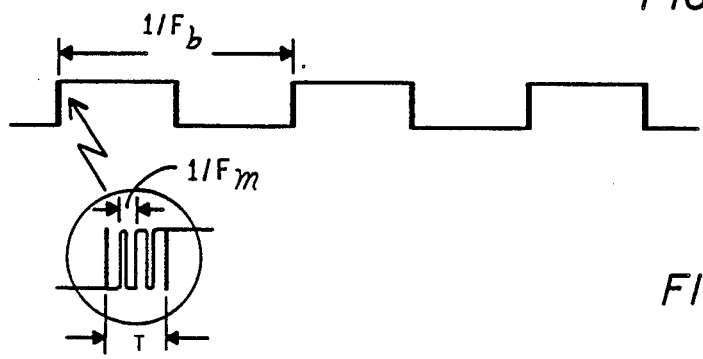
FIG. 10 is a diagram depicting the output signal of selector 304 in FIG. 9 prior to achieving phase lock.

The lock acquisition process of this embodiment, if not equipped with a frequency detector, is very similar to that of a conventional PLL. Before lock, output signal of selector 304 represents essentially a beat signal of frequency $F_b$ (as depicted in FIG. 10) equal to the difference between the FRAME RATE of the received signal (represented by the rate of master transitions in the training sequence of the received signal) and the free-running output frequency of VCO 305 (i.e. the frequency of VCO 305 with zero control signal input) divided by the division factor provided by frequency divider 306. As in a conventional PLL, in order for lock to be achieved, this beat frequency must, at least partially, pass through low pass filter 901 to reach the control lead of VCO 305. This again limits the maximum frequency tolerance of both the incoming data and the free running VCO frequency, only here for a different reason than in the first embodiment.

During lock acquisition, there are two regimes as the phase between the master transition in the training sequence and the selected clock edge monotonically changes. When the phase difference is such that the master transition is outside the phase modulation range of the clock edge, the phase modulation has no effect and the output of selector 304 is low or high depending on whether the selected clock edge occurs during the logical low or logical high portion of the training sequence. This corresponds to the parts of the waveform in FIG. 10 outside time interval T.

As shown in FIG. 10, there is a time interval T during which the master transition occurs within the range P (see FIG. 11) of the selected clock edge dither. ($T*F_b = P*$Frame-rate.) During this time T the output signal of selector 304 (FIG. 9) switches its logic state essentially at the dither frequency $F_m$, as shown in FIG. 10, with the switching instants being time quantized by the clock signal applied to selector 304. The duty cycle of this switching gradually changes from one extreme to the other, i.e. from 0% to 100%, as shown from the left edge of time interval T to its right edge in the enlarged part of FIG. 10.

As, in the course of lock aquisition, the frequency difference gradually drops and the change of phase of master transition vs. selected clock edge gradually slows, time T steadily increases. When T becomes large enough to be comparable with the time constant of low pass filter 901, the change in the duty cycle of the output signal of selector 304 occurs slowly enough to pass through low pass filter 901 and cause a proportional change on the control input lead of VCO 305. Ultimately lock occurs and the loop settles to an equilibrium. The timing relationship of the master transition versus the dither range P produces a duty cycle of the output signal of selector 304 resulting in the dc component required by VCO 305 to provide an output signal at a frequency equal to the BIT RATE of the received data. Thus, the inclusion of phase modulator 902 and low pass filter 901 converts the digital output signal of selector 304 into a continuously variable voltage or, in other words, allows digital phase detector 302 to operate much like an analog phase detector. The gain factor of phase detector 302 (i.e. volts per radian) is inversely proportional to the phase modulator dither amplitude P.

After lock has occurred, the gain factor of the phase detector in volts per radian is equal to the change of low pass filter 901 output voltage per change in phase between the selected clock edge's average position (center of modulation range) and the master transition. The low pass filter's output voltage is proportional to the duty cycle of the selector output signal. The gain factor is therefore proportional to the change of duty cycle per change in phase between the selected clock edge's average position and the master transition. If that phase changes so that the master transition moves from one end of the clock edge's phase modulation range P to its other end, the duty cycle changes from 0 to 100% or vice versa. The smaller the phase modulation range P (i.e. the clock edge's dither amplitude), the smaller change in phase between the master transition and the clock's average position is required to change the duty cycle from one extreme to the other. The gain factor is thus inversely proportional to the clock edge's phase modulation range P (dither amplitude). Jitter in the incoming data results essentially in a random phase modulation of the master transition. This is equivalent to jitter-free data and an enlarged clock phase modulation amplitude. As explained above, enlarging the clock edge's phase modulation range decreases the phase detector's gain factor. A smaller phase detector gain factor leads to a lower loop gain in the phase locked loop. As a result, for example, a change in the VCO's component values requires a change in its control voltage coming from the low pass filter to maintain its frequency equal to the incoming data rate. With a lower phase detector gain factor, this means a larger change in phase between the average position of the clock edge and the average position of the master transition to suitably change the duty cycle of the selector output and thus the low pass filter's output voltage. Thus, jitter in the incoming data decreases loop gain and can increase the static (average) error in sampling point position.

Figure 12:
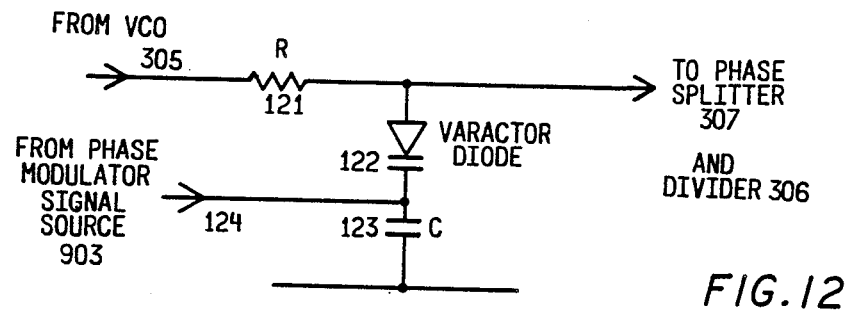
FIG. 12 is a schematic diagram of one embodiment of phase modulator 902 of FIG. 9.
Figure 13:
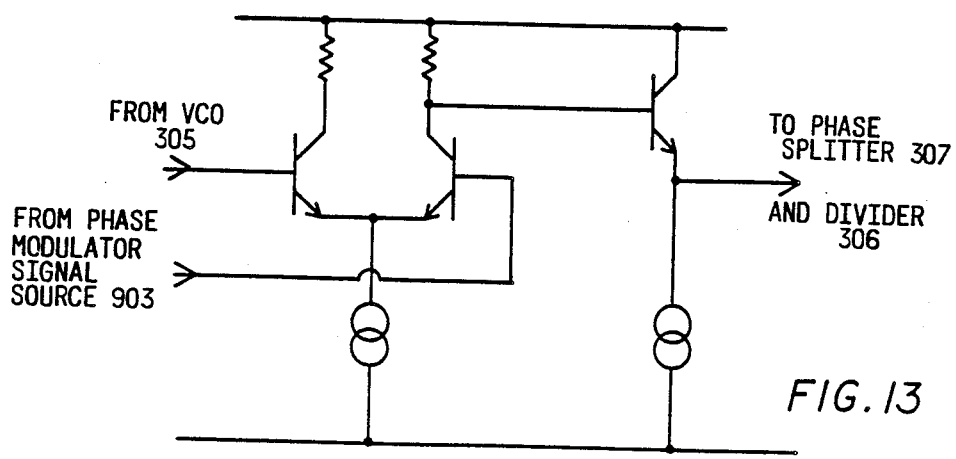
FIG. 13 is a schematic diagram of another embodiment of phase modulator 902 of FIG. 9.

When phase modulator 902 of FIG. 9 is a circuit which dithers both transitions of the output signal of VCO 305 by approximately the same amount, the dither also appears on the clock signal applied to sampler 303 and will thus affect the sampling point timing in a similar manner as in the first embodiment, previously described. One such phase modulator is shown in FIG. 12 and includes resistor 121, varactor diode 122, and bypass capacitor 123. It assumes a sinusoidal VCO output voltage. Resistor 121 and varactor diode 122 shift the phase of the VCO signal in direct dependence with the capacitance of varactor diode 122. The impedance of bypass capacitor 123 at the VCO frequency is much smaller than the resistance R of resistor 121. The capacitance of a varactor diode is a function of the voltage across it. The voltage across the varactor diode is being changed, and thus the phase shift of the VCO signal is being modulated by a phase modulator signal voltage imposed on lead 124. The impedance of capacitor 123 for the frequency $F_m$ of the phase modulating signal must be high enough not to excessively load the source of the phase modulator signal 903 in FIG. 9. This is easily achieved because $F_m$ can be made at least one hundred times lower than the VCO frequency. Another such phase modulator is shown in FIG. 13 and is based on the non-zero rise time of the VCO output voltage. The circuit of FIG. 13 represents an ECL logic circuit having a threshold voltage which is varied by the phase modulator driving voltage.

Of importance, static phase shift introduced by phase modulator 902 is inconsequential as long as it is the same for both transitions. Static phase shift of this kind equally influences the clock signals applied to phase detector 302 and sampler 303 and is compensated by an equal and opposite phase change of the output signal from VCO 305.

Any difference between the static phase shift introduced by phase modulator 902 to the positive and to the negative transitions of the output signal of VCO 305 changes the duty cycle of the phase modulator output signal. To keep the sampling point centered within the bit time interval, the circuit of FIG. 9 requires that the clock waveforms supplied by the phase splitter 307 be of 50% duty cycle. If required, the duty cycle control circuit shown in FIG. 7 can be added to the circuit of FIG. 9 in the same fashion as previously described with regard to the circuits of FIGS. 20a, 20b, and 4.

The advantage of he second embodiment is that VCO 305 is controlled via low pass filter 901, thus avoiding the need for VCO 305 to have very fast frequency control and avoiding the danger of phase discontinuities in the output signal of VCO 305 during step changes of VCO output frequency. In the first embodiment, the change in VCO frequency between its two alternating values must be accomplished in a small fraction (e.g. 1/10) of the frame duration. In the second embodiment, when the loop is in lock, the VCO frequency is not alternating between two values and is equal to the incoming data rate.

THIRD EMBODIMENT

Figure 14:
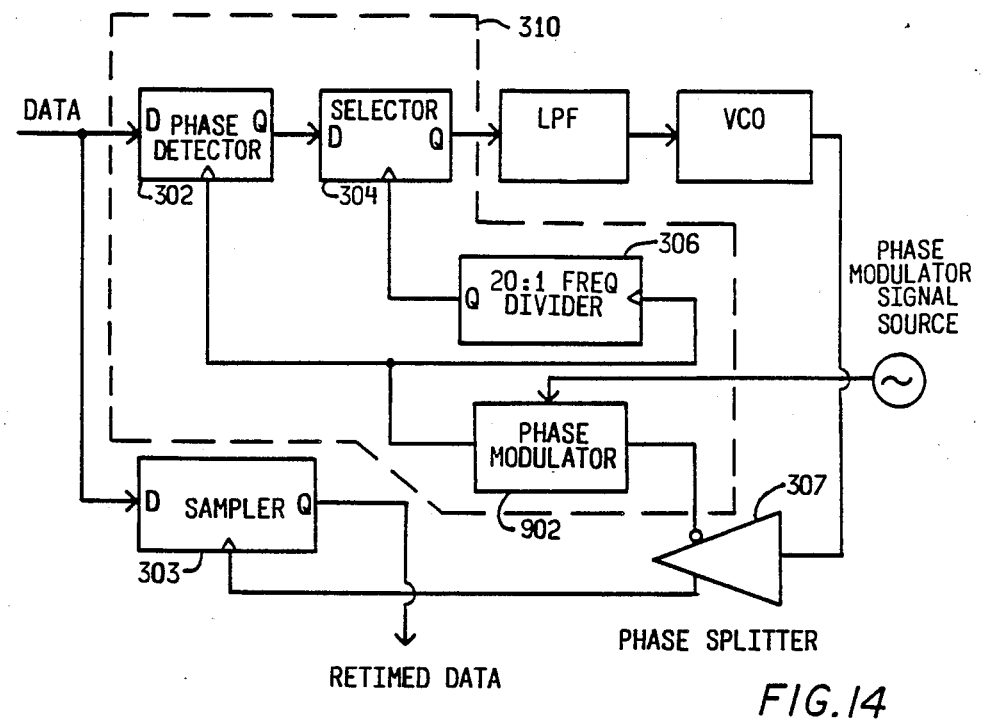
FIG. 14 is a block diagram of another embodiment of this invention which utilizes a phase modulator in the path of the clock signal applied to phase detector 302.
Figure 18:
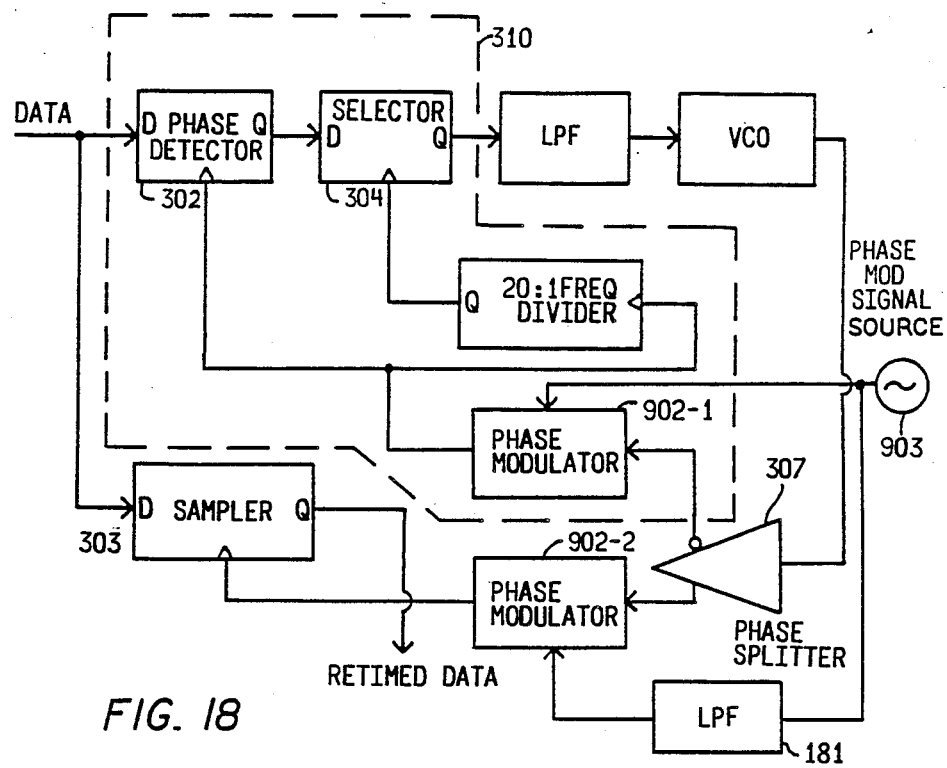
FIG. 18 is a block diagram of embodiment of this invention utilizing a first phase modulator controlling the clock signal applied to the phase detector and a second phase modulator controlling the clock signal applied to the sampler.
Figure 19:
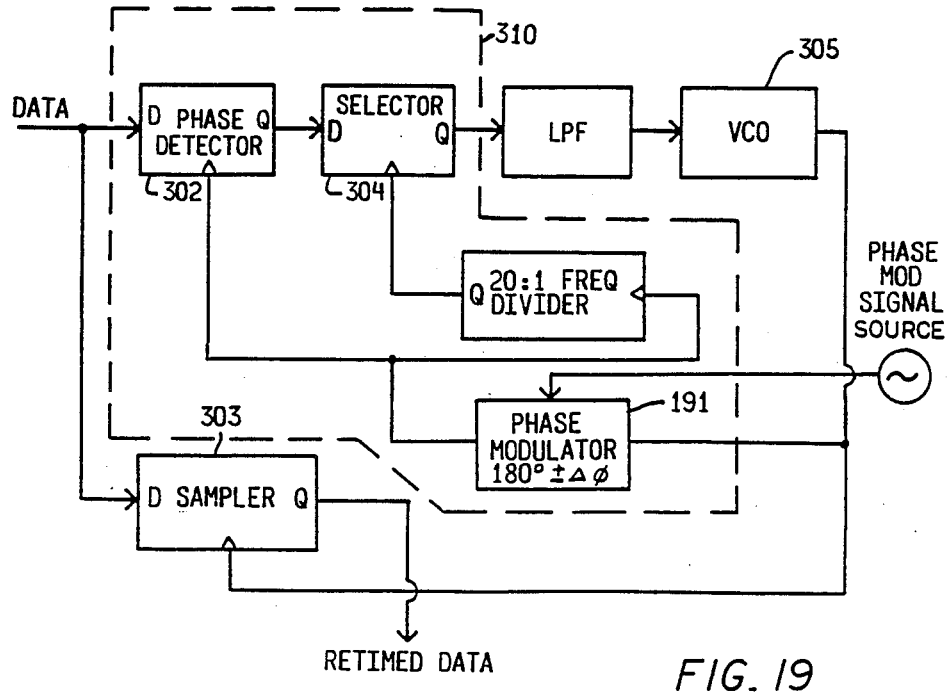
FIG. 19 is a block diagram of another embodiment of this invention which utilizes a phase modulator phase shifting the clock signal applied to the phase detector by an average of 180°.

For simplicity the third embodiment in FIGS. 14, 18, and 19 is shown with one selector 304, as was the case in FIG. 20b. However, if desired this embodiment can also be implemented by omitting selector 304 and inserting frequency divider 306 into the clock lead of phase detector 302 as shown in FIG. 20a, or by using two selectors 304-1; 304-2, as previously described with regard to FIG. 4.

Figure 15:
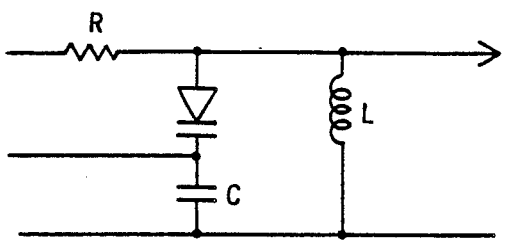
FIG. 15 is one embodiment of a phase modulator suitable for use in this invention.
Figure 16:
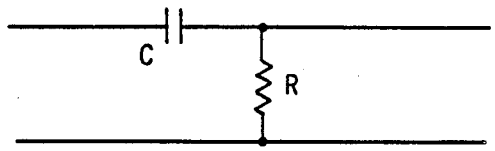
FIG. 16 is a schematic diagram of a phase advancing circuit suitable for use in conjunction with certain types of phase modulators.

One way to prevent the phase modulation from dithering the sampling point is to place phase modulator 902 between phase splitter 307 and the clock input lead of phase detector 302, as shown in FIG. 14. In this embodiment, any static phase shift of the clock edge occurring in phase modulator 902 results in a static timing error of the sampling point. To avoid this, phase modulator 902 in FIG. 14 must not introduce any static phase shift (i.e., must have a zero average phase shift). However, in order to modulate the phase but leave the average phase shift equal to zero, phase modulator 902 in FIG. 14 must be able to both advance and delay the phase and place the phase modulation range P symmetrically around zero phase shift. One embodiment of such a phase detector 302 is shown in the schematic diagram of FIG. 15, which comprises an LC network whose capacitance is controlled by varactor 151. The circuit of FIG. 15 is similar to the circuit in FIG. 12. Inductor L connected across the output is chosen to resonate with the series connection of the center-of-range varactor capacitance and bypass capacitor C at the incoming bit rate (i.e. at the frequency at which the VCO operates after lock has been achieved). The circuit assumes a quasi-sinusoidal output of phase splitter 307. At resonance, the phase difference between the input and output is zero. When the varactor capacitance increases above its center-of-range value, the output phase will lag. When the varactor capacitance decreases, the output phase will lead. Alternatively, a varactor controlled RC network (as shown in FIG. 12) or a threshold controlled logic gate (FIG. 13) are suitable for use as phase modulator 902 but, since such circuits of FIG. 12 and FIG. 13 are capable of only retarding the phase clock signal applied to phase detector 302, a fixed phase advancing circuit must be added in cascade with the circuits shown in FIG. 12 or FIG. 13. An example of a simple phase advancing circuit is shown in FIG. 16, again assuming a quasi-sinusoidal signal.

The need for a phase-advancing element in phase modulator 902 of FIG. 14 is avoided if the static phase delay of phase modulator 902 in the clock line of phase detector 302 is compensated by an equal fixed phase delay in the clock line of sampler 303. One embodiment of a circuit constructed in accordance with the teachings of this invention which eliminates the need for a phase-advancing element in phase modulator 902 is shown in the schematic diagram of FIG. 18, and includes matched phase modulators 902-1 and 902-2. Phase modulator 902-1 is connected in the same manner as phase modulator 902 of the embodiment of FIG. 14, and phase modulator 902-2 is connected to phase modulate the output signal of phase splitter 307 which is applied to sampler 303. Phase modulator 902-2 receives its phase modulation control signal from phase modulator signal source 903 which is conditioned by low pass filter 181 in order to provide phase modulator 902-2 with a dc voltage equal to the average value of the phase modulating signal applied to phase modulator 902-1. Alternatively, other means for providing a dc voltage equal to the average value of the phase modulating signal applied to phase modulator 902-1 can be employed to provide a phase modulation signal for phase modulator 902-2. The drifts in static phase errors of matched modulators 2-1 and 902-2 are substantially identical and therefore their effects cancel. In this embodiment, it is important that the output signals of phase splitter 307 have a substantially 50% duty cycle, and phase splitter 307 can advantageously be formed as previously described with regard to FIG. 7, which includes duty cycle control circuitry.

Figure 17:
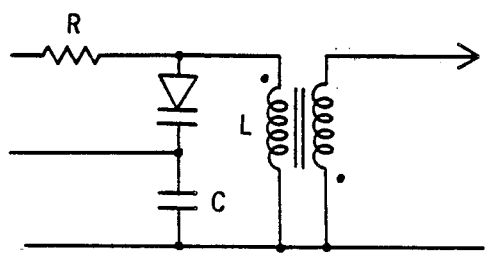
FIG. 17 is a schematic diagram of an embodiment of a phase modulator suitable for use with the embodiment of FIG. 19.

As shown in the embodiment of FIG. 19, an alternative technique for preventing the phase modulation from dithering the sample point is to omit phase splitter 307 and provide phase modulator 191 in the clock line to phase detector 302 to have a phase shift which dithers a center position of 180 degrees. One embodiment of phase modulator of this type can be implemented, for example, by complementing the phase modulator in FIG. 15 by a phase inverting transformer which can be lumped with inductor L, as shown in FIG. 17. Again, we assume that the signal has a quasisinusoidal shape.

In each of the embodiments discussed above, it is required that the clock edges triggering sampler 303 lay in the center between consecutive average positions of the clock edges triggering frequency divider 306 in FIG. 20a or phase detector 302 in FIGS. 20b and 4 in order to guarantee proper location of the sampling point at the center of the bit time interval. In the embodiments of FIGS. 20a, 20b, 4, and 9 this condition is met as long as the output signals of phase splitter 307 have a 50% duty cycle. In addition, in the embodiments of FIGS. 14 and 19, it is required that the static phase shifts in the phase modulators versus time and temperature be very stable in order ensure correct sampling point timing. Similarly, in the embodiment of FIG. 18, it is required that the static phase shift in the phase modulators 902-1 and 902-2 versus time and temperature accurately track each other in order to ensure correct sampling point timing.

In the embodiment of FIG. 14, a deviation from 50% duty cycle of the output signals of phase splitter 307 can be corrected by providing a compensating static phase shift in phase modulator 902, i.e. by a proper non-zero average value of the phase modulation. In the embodiment of FIG. 18 the same result can be achieved by creating a proper difference between the static phase shifts of phase modulators 902-1 and 902-2, i.e. by creating a proper difference between dc components of the two modulator drive voltages. In one embodiment of this invention, a circuit controlling one or more modulators prevents both the clock duty cycle and the static drift of the modulators from adversely influencing sampling point position.

Again, the explanation which follows pertains equally to structures using a selector 304 or omitting it and having frequency divider 306 inserted in the clock line of phase detector 302. For simplicity, the following explanation will assume the use of selector 304.

In order to compensate for the errors from all causes of sampling point misplacement, the average phase difference between the clock applied to sampler 303 and the clock applied to phase detector 302 is determined. In the event this phase difference is other than the proper value of 180 degrees, corrective action is taken. One embodiment of a circuit which automatically performs this determination and corrective action is shown in FIG. 21, with its waveforms shown in FIG. 22.

Figure 21:
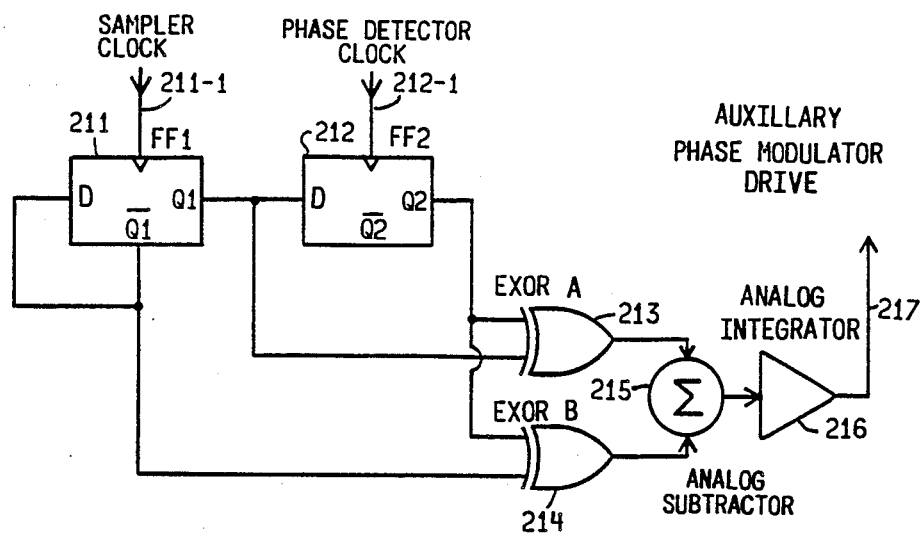
FIG. 21 is a diagram depicting the structure which insures that the proper phase difference of 180° is maintained between, the sampler clock and phase detector clock.
Figure 22:
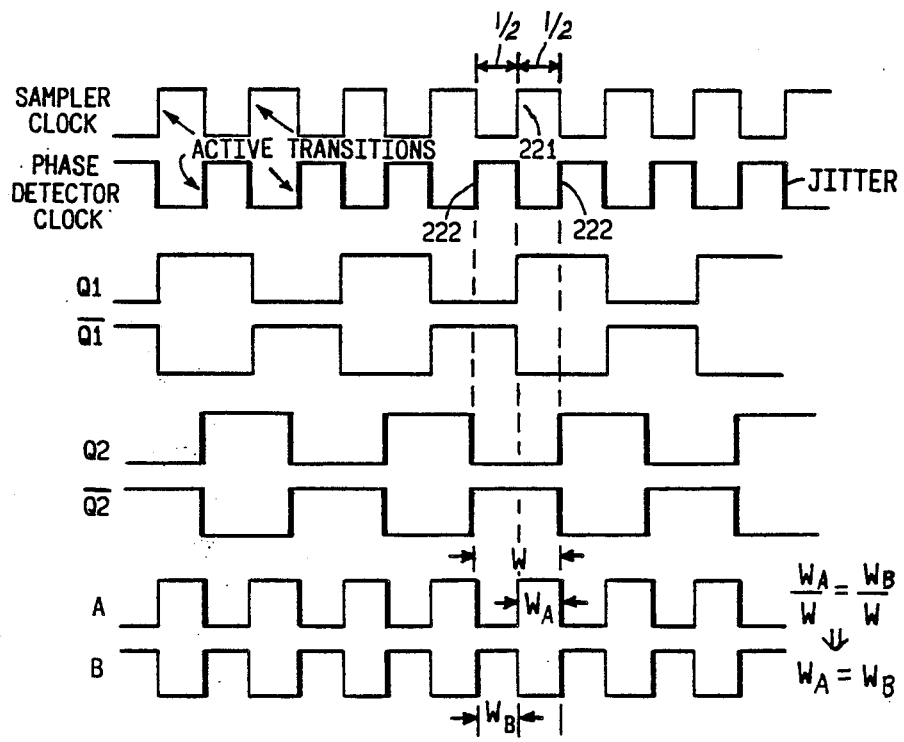
FIG. 22 is a set of timing diagrams depicting the operation of the structure of FIG. 21.

As shown in FIG. 21, two matched flip flops are connected with their respective clock input leads receiving the clock signals applied to sampler 303 and to phase detector 302. Flip flop 211 serves as a toggle flip flop and flip flop 212 serves as a shift register stage. Output signals Q1 and Q2 in FIG. 22 of flip flops 211, 212, respectively, each are pulses of 50% duty cycle. The phase modulation of the phase detector clock and the resulting dither of the Q2 output signal are indicated by widening the respective transitions in FIG. 22. The Q2 output signal is fed to a first input lead of each of two Exclusive OR gates 213, 214. The Q1 output signal is applied to the second input lead of Exclusive OR gate 213 and its inverse is applied to the second input of Exclusive OR gate 214. The output signals of Exclusive OR gates 213 and 214 are pulses which are subtracted from each other by analog subtractor 215, with their difference being integrated by analog integrator 216. The output voltage from integrator 216 changes until the dc component of the output pulses from Exclusive OR gate 213 matches the dc component of the output pulses from Exclusive OR gate 214. Since Exclusive OR gates 213, 214 are closely matched, they have the same logic high and logic low voltage levels, causing the dc components of their output signals to be matched when their output signals A and B, respectively, have identical duty cycles, $$\frac{W_A}{W} = \frac{W_B}{W}$$

i.e. when the active (positive-going) transition 221 of the clock signal applied to sampler 303 lay in the center between the average positions of the active (positive-going) transitions 222 of the clock signal applied to phase detector 302.

Figure 23:
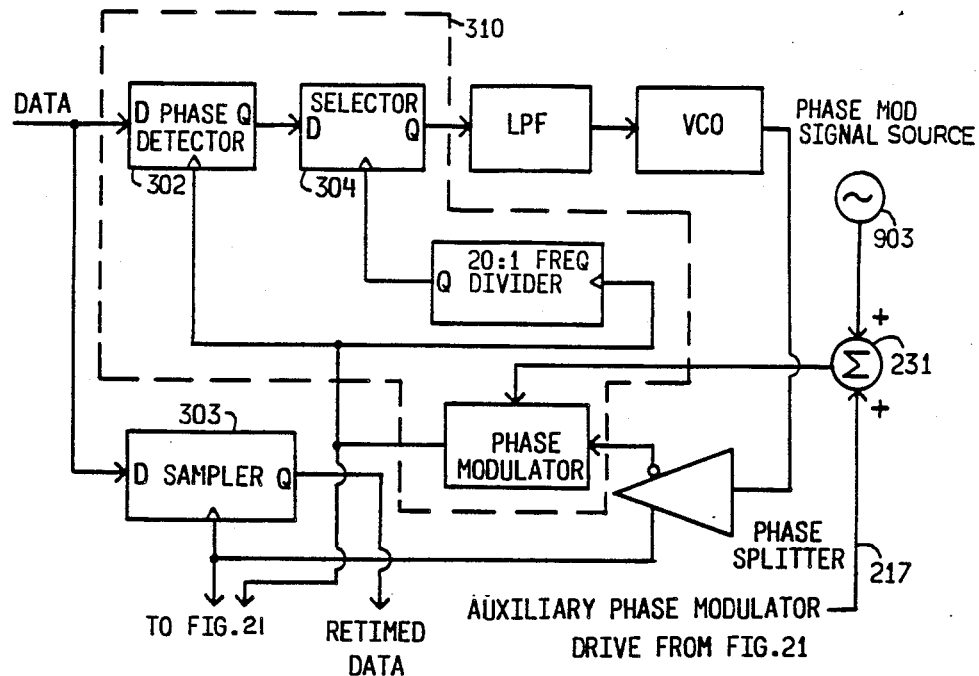
FIGS. 23, 24, and 25 depict embodiments where the signal on output lead 217 of analog integrator 216 of FIG. 21 is used in conjunction with the circuits of FIGS. 14, 18, and 19, respectively.
Figure 24:
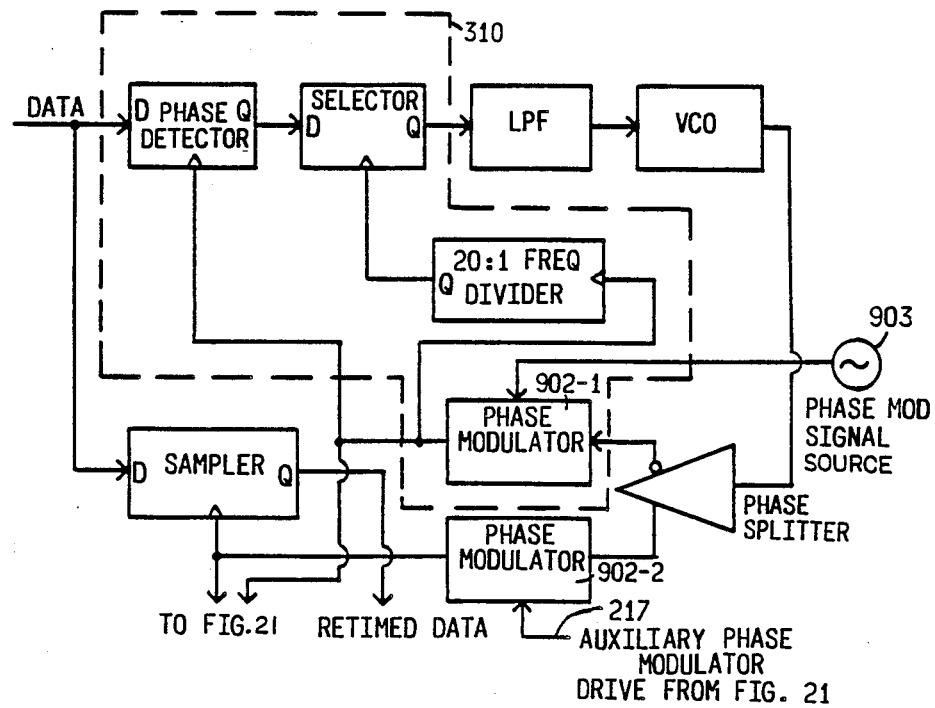
Figure 25:
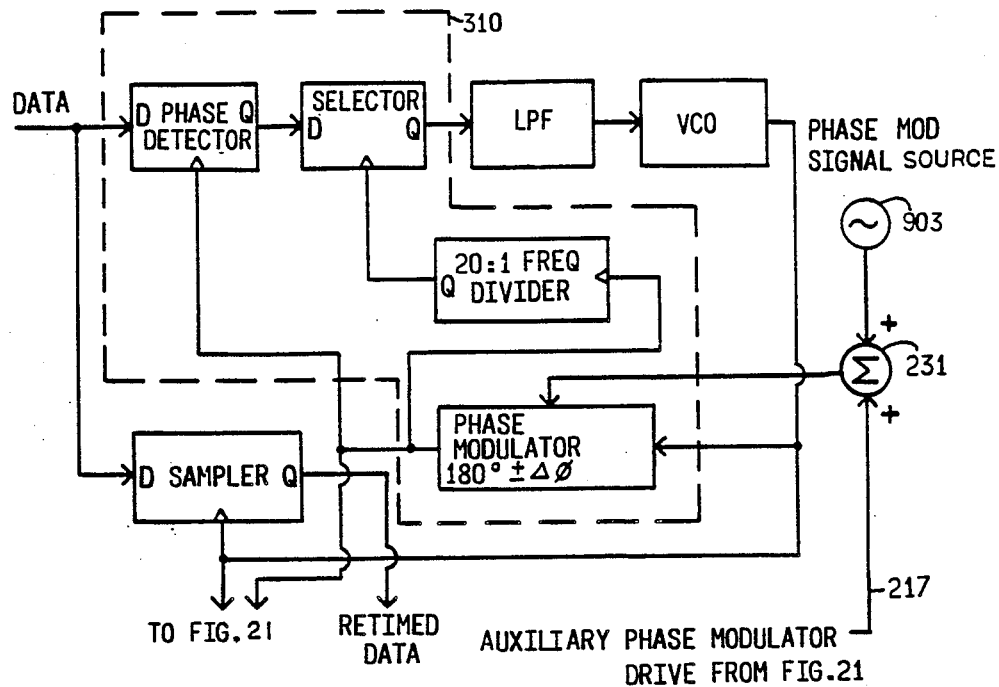

The dither of the phase detector clock has only a negligible influence on the output voltage of analog integrator 216 because the bandwidth of integrator 216 is chosen to be much lower than the dither frequency. FIGS. 23, 24, and 25 show how the signal on output lead 217 of analog integrator 216 is used in conjunction with the circuits of FIGS. 14, 18, and 19, respectively. In the embodiments of FIGS. 23 and 25 the output voltage from integrator 216 serves as an auxiliary phase modulator drive signal which is summed with the primary phase modulator drive signal from phase modulating signal source 903 by analog summer 231. In the embodiments of FIG. 24 the output voltage of integrator 216 drives phase modulator 902-2 in the clock line of sampler 303. By proper selection of the input polarities of analog subtractor 215 of FIG. 21 (or of polarities elsewhere in the loop) a self-regulating feedback loop is created, which responds to any deviation of the sampling point location, caused by a change in a phase modulator static phase shift and/or by a deviation of the phase splitter output signal duty cycle from 50%, by a correcting change in the output voltage of integrator 216.

The lock aquisition process of this embodiment is identical to that described for the second embodiment. Addition of a phase modulator into the clock line of sampler 303 and/or the phase balancing circuit of FIG. 21 does not influence the lock-in procedure.

For better illustration of both the second and third embodiments a numerical example follows:

| Assumptions: | |
|---|---|
| Nominal BIT RATE of received data: | 2000 MHz |
| Nominal FRAME RATE: | 100 MHz (20 bit time intervals per frame) |
| BIT RATE tolerance of received data: | ±300 kHz |
| VCO center frequency tolerance: | ±300 kHz |
| VCO Tuning range | ±1 MHz |
| Frequency of phase modulating signal: | $F_m$ = 5 MHz |
| Amplitude of phase modulation: | 20 degrees peak-to-peak of bit time interval, i.e. 28 ps peak-to-peak |
| Waveform of phase modulation: | sinusoidal |
| Received data is free of jitter | |
| Flip flops are free of hysteresis. | |

Let us first investigate the maximum deviation of the sampling point position from the center of the bit time interval for the third embodiment, where the clock signal applied to sampler 303 is not dithered.

Figure 11:
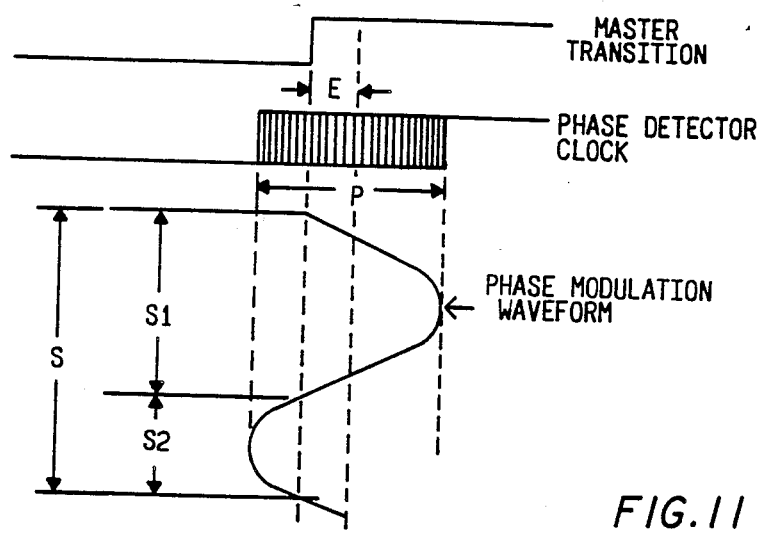
FIG. 11 is a diagram depicting the change in phase of the phase detector clock signal with respect to the master transition in the embodiment of FIG. 9, after achieving phase lock.

The worst case deviation occurs when the center frequency of VCO 305 differs from the BIT RATE of the received data by the maximum possible amount allowed by the frequency tolerances, i.e. by a total of 2*300 kHz=600 kHz. To match the received data BIT RATE in this worst case, the frequency of VCO 305 must be shifted by 600 kHz from its center frequency. To safely accommodate the 600 kHz maximum difference a full scale tuning range of ±1 MHz is reasonable. With this 2 MHz tuning range (and linear frequency control) the control voltage applied to VCO 305 must change by 30% of its full range from the range center to achieve a 600 kHz frequency shift. The VCO control voltage is the dc component of the output voltage of selector 304, and the full range of control voltage corresponds to a range of 0% to 100% duty cycle of the output signal of selector 304. Thus, to change the VCO control voltage by 30% of its range, the selector 304 output signal duty cycle must change by 30%, i.e. from 50% to 20% or to 80%, depending on the direction of the frequency change. With the loop in lock, the duty cycle of selector 304 output signal is determined by the position of the master transition with respect to the dither range of the clock signal applied to the phase detector. FIG. 11 depicts the master transition, the phase detector clock edge including its dither range P, and a sinusoidal phase modulating waveform. During the S1 portion of the modulating sinusoid the clock edge occurs after the master transition, thus the output signal of selector 304 is high. During the S2 portion of the modulating sinusoid the output signal of selector 304 is low. The duty cycle is q=S1/(S1+S2). To achieve a duty cycle of q with a sinusoidal phase modulation waveform, the master transition must be off the center of the modulation range P by a factor of E, where $$E/P = (\tfrac{1}{2}) * \sin((0.5-q)*180 \ deg).$$

To achieve a change in duty cycle from q=50% to q=80% (required to accommodate a 600 kHz frequency difference) E=40% of P. With a peak-to-peak dither of P=20 degrees as assumed before, E is −8 degrees.

With a triangular phase modulation waveform, E/P=0.5-q and for q=80%, E=30% of P.

In the embodiments of FIGS. 14, 18, 19, 23, 24, and 25, the clock applied to sampler 303 is not dithered but its position follows the static error of the phase detector clock edge relative to the master transition. With that error equal to E the error in sampling point position relative to the center of the bit time interval is also E. Thus in the above numerical example the sampling point position error could be up to ±8 degrees of phase relative to the center of the bit time interval.

In the second embodiment (FIG. 9) the clock applied to sampler 303 follows the dither of the clock applied to phase detector 302. Thus in the above numerical example the sampling point position error could reach ±18 degrees (i.e. ±8 degrees of static error as described in the previous paragraph plus the ±10 degrees of dither).

One way to decrease these errors is to decrease the dither amplitude P. The lower range of P is limited by the jitter of the received master transition and by flip flop hysteresis.

Another way to decrease the static error in the second and the total error in the third embodiment, is to include gain between the output lead of low pass filter 901 and the control input lead of VCO 305. However, to ensure the signal applied to the control input lead of VCO 305 is free from the ac component of the output signal of selector 304 (in order to avoid phase discontinuities in the output signal of VCO 305) the time constant of low pass filter 901 must be increased proportionally. This can lead to long loop recovery times when, for example, data is not present on the received signal and, therefore, the output signal of selector 304 is constantly high or low.

FOURTH EMBODIMENT

In this embodiment the advantage of the small errors in sampling point position of the first embodiment are maintained while using a conventional VCO with slow frequency control.

Figure 26:
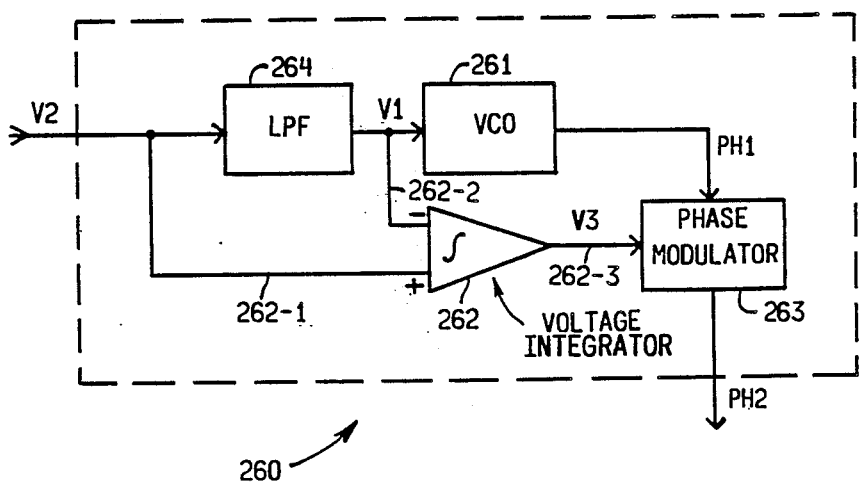
FIG. 26 is a block diagram of a circuit which may function as a fast frequency switching VCO while utilizing a slow frequency switching VCO.
Figure 27:
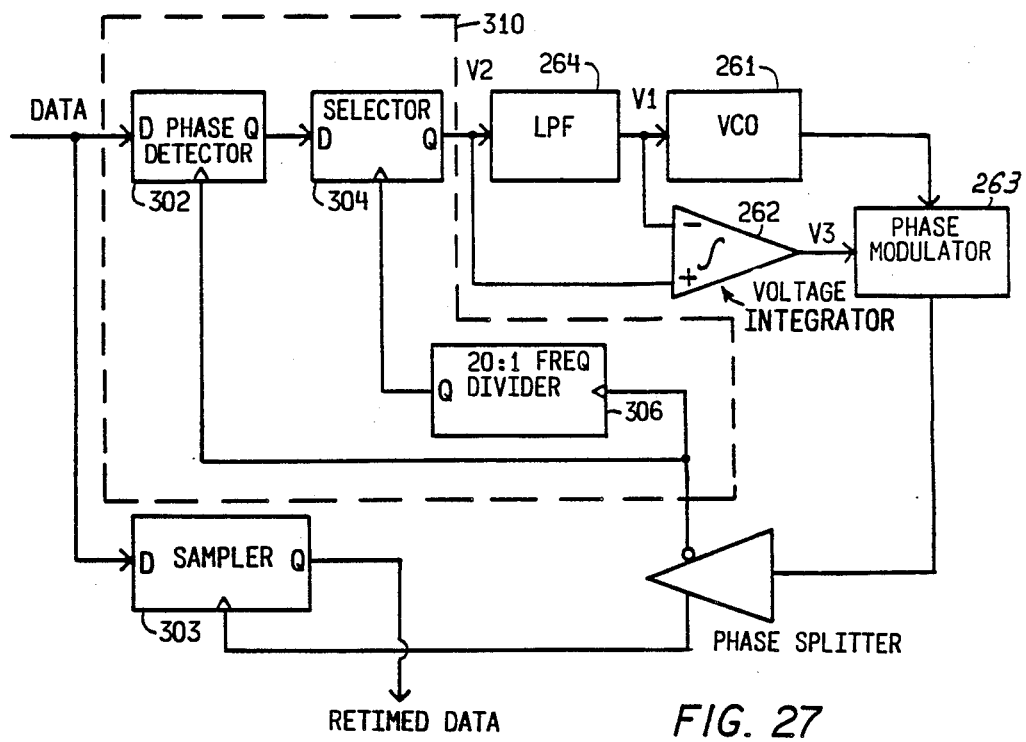
FIG. 27 is a diagram depicting a structure of this invention utilizing the structure of FIG. 26.

A VCO with fast frequency switching is emulated by the circuit of FIG. 26 which includes a conventional slowly controlled VCO 261, integrator 262, and phase modulator 263. With a fast frequency switching VCO as used in FIGS. 20a, 20b, and 4, the phase difference between the master transition and the selected clock edge is equal to the time integral of the difference between the BIT RATE of the received signal and the instantaneous clock frequency, as shown in FIGS. 5 and 6. In FIG. 27 the conventional "slow" VCO 261 is controlled by control voltage V1 which is derived by passing voltage V2 (the output of selector 304) through low pass filter 264 to ensure no fast transients remain in control voltage V1. Alternatively, if selector 304 is omitted and frequency divider 306 is located in the clock lead of phase detector 302, voltage V2 is the output voltage of phase detector 302. Voltage integrator 262, having differential input leads, integrates the difference between the input voltage V2 and the output voltage V1 of low pass filter 264. Integrator 262 provides output voltage V3 which controls phase modulator 263 modulating the clock signal generated by slowly controlled VCO 261.

Assuming that the control characteristic of "slow" VCO 261 is linear:

$$\Delta f = k1 * V1$$

where $\Delta f$ = change in VCO frequency;
$k1$ = VCO gain factor;
and
$V1$ = the control voltage applied to VCO 261.

Further assuming that integrator 262 is linear:

$$V3 = k2 * (\int (V2 - V1)dt)$$

where $V3$ = the output voltage of integrator 262;
$k2$ = proportionality factor;
and
$V2$ = the input voltage to low pass filter 264.

Assuming that the operation of phase modulator 263 is described by:

$$(\phi 2 - \phi 1) = k3 * V3;$$

where $\phi 1$ = the phase of the input signal applied to phase modulator 263;
$\phi 2$ = the phase of the output signal from phase modulator 263; and
$k3$ = phase detector gain factor.

Assuming that V1 will change at a rate which slow VCO 261 can follow, the phase change $\phi 1$ of the output signal of VCO 261 is:

$$\phi 1 = \int \Delta f dt = \int (k1*V1)dt.$$

The phase $\phi 2$ of output signal of phase modulator 263 is:

$$\begin{aligned}\phi 2 &= \phi 1 + k3 * V3 \\ &= \int (k1 * V1)dt + k3 * k2 * \int (V2 - V1)dt.\end{aligned}$$

If k1=k2*k3, then:

$$\phi 2 = \int (k1*V2)dt.$$

According to the last equation, circuit 260 of FIG. 26 behaves as a "composite VCO" having a frequency control voltage V2, an output signal of desired phase $\phi_2$, a speed of response independent of "slow" VCO 261 and with phase continuity guaranteed by the absence of discontinuities in the output voltage of integrator 262.

Because dc signals pass through a low-pass filter with no attenuation, the dc-component of a signal at the input of a low pass filter is equal to the dc-component of the signal at the output of the low pass filter. The differential input terminals of the integrator are connected to the input and to the output of the low pass filter, respectively. With the dc-component on these two nodes being the same, there is no dc-voltage difference between the two integrator input terminals. The integrator is driven by an ac signal only which is equal to the difference between the low pass filter input and output signals. An ac signal has, by definition, zero average value. The integral of a function with zero average value is a function with zero average slope. A function with zero average slope is bound, i.e. it cannot grow without limit. Furthermomre, with no dc component in the input voltage of integrator 262, correct function of the integrator must extend to ac signals only. This simplifies the realization of the integrator because the effect of inherent dc errors such as offset voltage or offset current in the integrator's differential input can be excluded by ac-coupling.

FIG. 27 depicts an alternative embodiment of the circuit of FIG. 20b where VCO 305 of FIG. 20b is replaced by circuitry 260 of FIG. 26. Any static phase error generated by integrator 262 and/or phase modulator 263 results in a slow change in the VCO frequency. The change in the VCO phase accumulated from the VCO frequency change compensates the integrator or modulator phase error and the VCO frequency returns to its original value equal to the incoming bit rate.

As discussed in the first embodiment (emulated by the circuit in FIG. 27), when in lock, the phase of the selected clock edge is slightly changing back and forth so that the clock edge appears alternately just before and just after the master transition. This change in clock phase is only a very small portion of the bit time interval. Even if it were no phase modulation from the VCO and this phase shift were generated entirely by the phase modulator, the required operating range of phase modulator 263 is only a few degrees, which is easy to satisfy by the phase modulators shown in FIGS. 12 and 13.

In order for the embodiment in FIG. 27 to behave as the first embodiment also during lock acquisition without a frequency detector, in addition to the condition of k1 = k2 * k3, phase modulator 263 must have a specific phase modulation range R. Assuming that low pass filter 264 has a single pole of time constant $\tau$ the required phase modulation range is approximately:

$$R = 2 * \pi * \tau * (\Delta f),$$

where $\Delta f$ is the emulated fast frequency step of the VCO.

In an embodiment where low pass filter 264 is a 2-pole filter with both poles of time constant $\tau$, the required phase modulation range is approximately:

$$R = 4 * \pi * \tau * (\Delta f).$$

To find the limits of filter time constant $\tau$ requiring a phase modulator range of not more than 45° (easy to implement by phase modulators in FIGS. 12 and 13) we will use the same example as used in the first embodiment:

| | |
|---|---|
| Nominal bit rate of received data: | 2000 MHz |
| Bit rate tolerance: | 300 kHz |
| Tolerance of VCO center frequency $f_c$: | 300 kHz |
| Emulated fast VCO frequency step ($\Delta f$) = 2 MHz | |

The resulting maximum time constant $\tau$ for a single pole low pass filter 264 is:

$$\begin{aligned}
\tau &= R/(2 * \pi * (\Delta f)) \\
&= \pi/4)/(2 * \pi * (\Delta f)) \\
&= 1/(8 * (\Delta f)) \\
&= 1/(8 * 2E6) \\
&= 62.5 \text{ ns}
\end{aligned}$$

For a two-pole low pass filter 264, the resulting maximum time constant of each of the two poles would be the half, i.e., 31.25 ns.

With either of these filters in the VCO control input path, the control voltage cannot change faster than with a 62.5 ns time constant. A 2000 MHz oscillator generates 125 periods during this time. It can be safely assumed that a control voltage with a time constant greater than or equal to 62.5 ns will not create unwanted phase discontinuities.

However, let us investigate also the case when the low pass filter 264 in FIG. 27 has a frequency limit equal to the maximum difference between the incoming data rate and the VCO's center frequency $f_c$, i.e. 600 kHz. This corresponds to a low pass filter time constant of 265 ns. In order for the circuit in FIG. 27 with this low pass filter to behave as the first embodiment also during lock acquisition, the range of the phase modulator would have to be approximately:

$$\begin{aligned}
R &= 2 * \pi * \tau * (\Delta f) \\
&= 2 * \pi * 265E\text{-}9 * (2E6) \\
&= 1.06 * \pi \\
&= 191°.
\end{aligned}$$

This range exceeds the capabilities of the phase modulators shown in FIGS. 12 and 13. The circuit in FIG. 27, if equipped with a low pass filter limiting at 600 kHz and a phase modulator of a range lower than approximately 190° will undergo a lock acquisition process similar to the lock acquisition described for the second and third embodiment.

FIFTH EMBODIMENT

In the fourth embodiment (as well as in the first) the phase modulation (artificial in the fourth, resulting from fast VCO frequency switching in the first) appears in the clock supplied to the phase detector flip flop as well as in the clock supplied to the sampler flip flop. After lock has been acquired and data transmission has begun, this unnecessarily adds to data sampling point deviations from the bit time interval center. This can be avoided by relocating the phase modulator from the VCO output (as shown in FIG. 27) into the clock line of the phase detector flip flop (as shown for example in FIG. 14).

Figure 28:
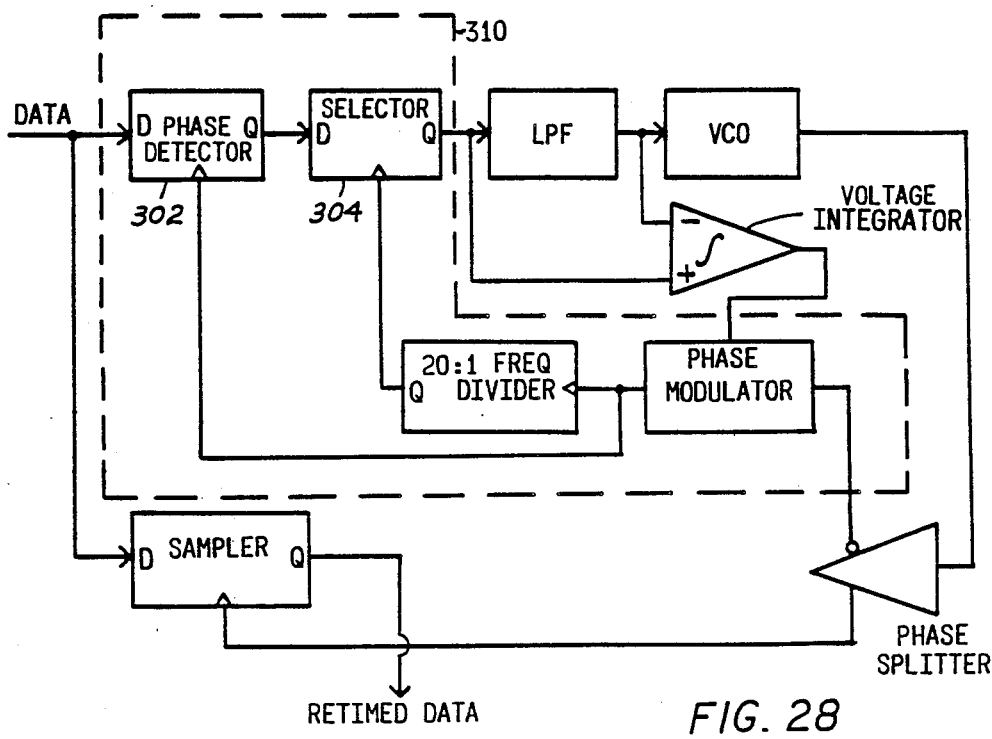
FIG. 28 is a diagram depicting an embodiment of this invention in which the phase modulation signal source is replaced by a voltage integrator.

In general, the fifth preferred embodiment consists of all variations of the third preferred embodiment, i.e. FIGS. 14, 18, 19, 21, 23, 24, and 25, in which the phase modulation signal source 903 is replaced by a voltage integrator with its differential inputs connected to the input and output of the low pass filter respectively. As an example, FIG. 28 illustrates the fifth preferred embodiment derived from the variation of the third preferred embodiment shown in FIG. 14.

The Startup Sequence

All above described embodiments assume a training sequence (as shown in FIG. 2e) is transmitted during the lock acquisition process. However, the purpose of the link is to transmit data; therefore the link transmitter can start data transmission only after the receiving end of the link has locked. The proper time to begin data transmission can be determined by the transmitter in the following ways:

In the first method, the receiver loop's worst case lock acquisition time is ascertained for a particular circuit structure. The transmitter is then equipped with a fixed delay which causes, at start-up, sending of the training sequence over a time at least as long as the receiver's worst case lock acquisition time. When the transmitter begins data transmission, the receiver will be in lock.

A second method assumes two links operating in a full-duplex configuration between station A and station B. This means that data can flow simultaneously from station A to station B over the first link and from station B to station A over the second link. The transmitters in both stations are equipped to generate at least two different training sequences. All training sequences have only one positive and one negative transition per frame as required by the acquisition process, described above. For example, one training sequence can be a 50% duty cycle square wave as shown in FIG. 2e, and the other training sequence can be a similar waveform with a duty cycle Q other than 50%. Alternatively, if zero dc-component (balanced line code) is essential, the other training sequence can consist of an alternation of two waveforms with duty cycles Q and 1-Q. At startup, both stations send the first training sequence, for example the one with 50% duty cycle. The process of lock acquisition begins in both stations. When a station acquires lock, it switches from sending the first training sequence to sending the second one, for example with an alternating duty cycle of Q=40% and 1-Q=60%. This change does not disturb the lock acquisition by the other station if it is still occurring. After the other station acquired lock, it also switches from sending the first training sequence to sending the second training sequence. Each of the two stations begins to transmit data only when it is both locked and receiving the second training sequence. Whether a stations is in lock or not can be determined by sensing the bit immediately preceding and the bit immediately following the selected clock edge. In lock, these bits straddle the master transition and must continuously be detected as a zero and a one, respectively. Any deviation from the is rule indicates that lock has not yet been acquired or has been lost.

Addition of Frequency Detector

In all embodiments described above, the assumption was made that, in the worst case, the VCO center frequency differs from the incoming data rate by a fraction of a percent. In the numerical examples above, the assumed maximum difference was 600 kHz at a nominal bit rate of 2 GHz, i.e., 0.03%. This can be achieved by using precision frequency determining elements such as crystals or Surface Acoustic Wave devices in the transmitter to set the bit rate and in the receiver to set the VCO center frequency. Precision frequency elements are, however, costly and complicate any change in link bit rate if that becomes necessary.

The following description complements any of the previously described embodiments by addition of a frequency detector. The frequency detector assists the loop phase detector to achieve lock even if the VCO free-running frequency is anywhere between 75 and 150% of the incoming bit rate. This is performed at the beginning of the lock acquisition process, by bringing the VCO frequency so close to the incoming data rate that the loop phase detector can complete lock as described in the previous embodiments.

The frequency detector operation is based on the initial transmission of the same training sequence (FIG. 2e) as the phase detector operation. The frequency detector operation is described as it is complementing the second embodiment shown in FIG. 9, although it will be readily apparent to those of ordinary skill in the art in light of the teachings of this invention that the description can be easily applied to all embodiments of this invention.

Figure 29A:
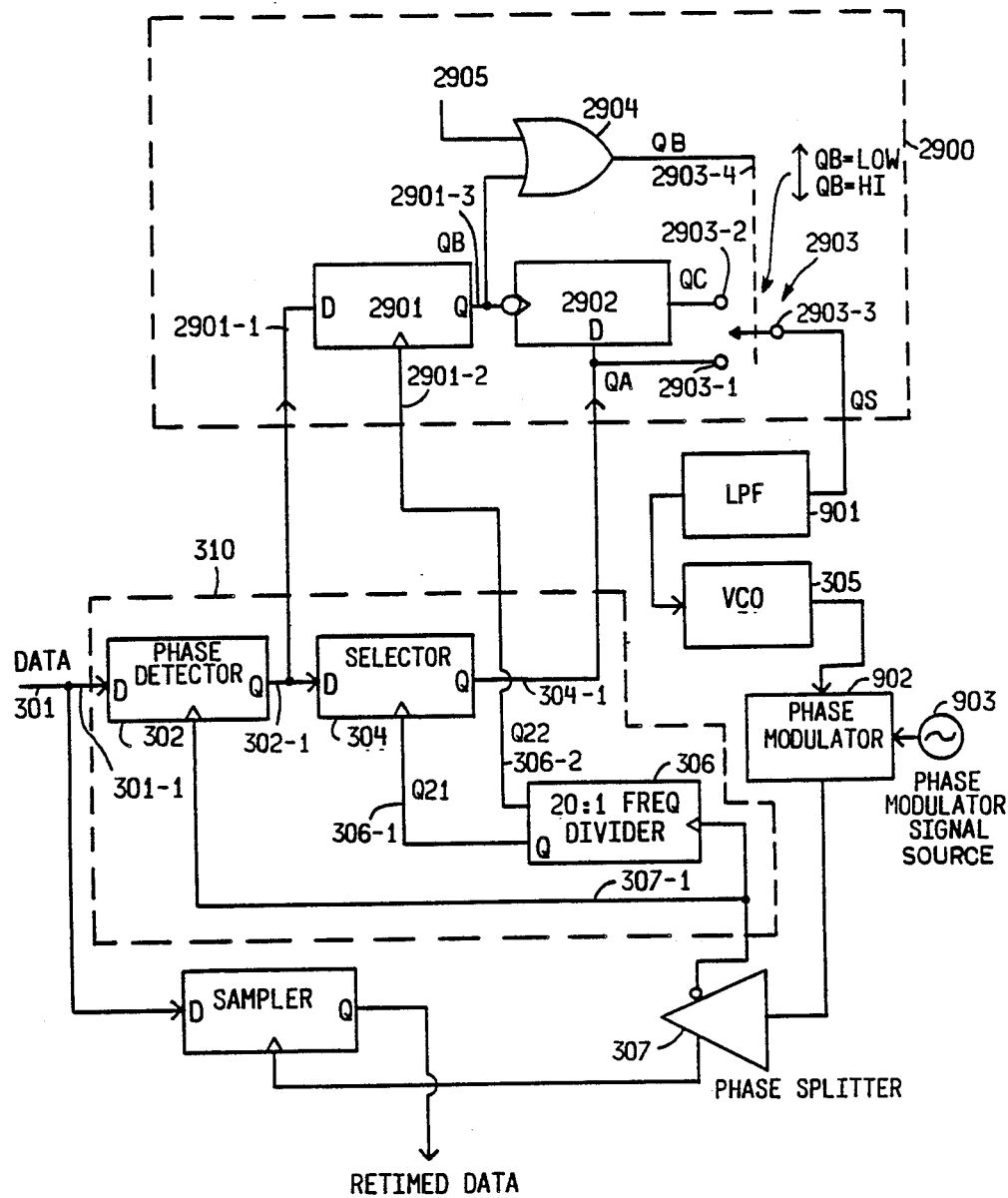
FIGS. 29a and 29b are diagrams depicting embodiments of this invention similar to that of FIG. 9, but with the addition of a frequency detector.
Figure 30:
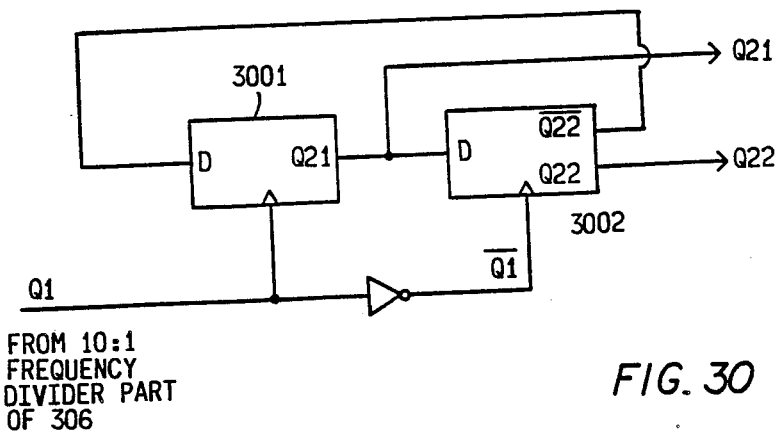
FIG. 30 is a 2:1 frequency divider which is part of the 20:1 frequency divider 306 in FIG. 29.
Figure 31:
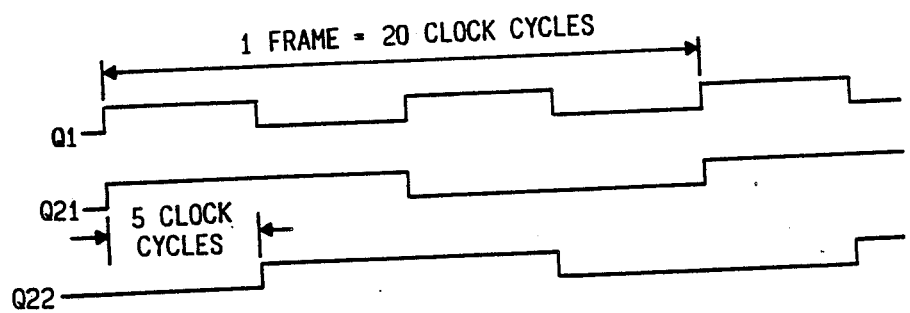
FIG. 31 are timing diagrams depicting the operation of the structure of FIG. 30.

As shown in FIG. 29a, frequency detector components have been added to the embodiment of FIG. 9. The 20:1 frequency divider 306 in FIG. 29a is implemented, for example, as a 10:1 frequency divider followed by a 2:1 frequency divider. FIGS. 30 and 31 depict the 2:1 divider and its operation. For simplicity and ease of understanding, zero propagation delays are assumed in FIG. 31. The 2:1 frequency divider consists of 2 D-latches 3001 and 3002 which are clocked by signal Q1 and $\overline{Q1}$ respectively, coming from the 10:1 frequency divider portion of divider 306. Latches 3001 and 3002 are connected as a well known master-slave "divide by two" flip-flop. As shown in FIG. 31, both latches are assumed to be positive-transparent. Due to the preceding 10:1 frequency divider, output Q22 lags behind output Q21 by 5 VCO clock cycles (not shown).

As shown in FIG. 29a, output Q21 of 20:1 divider 306 clocks selector 304, a positive-edge triggered D-flip-flop, which samples and holds on its output the response of phase detector 302 to every 20th clock edge supplied by the VCO, as previously described. Output Q22 of divider 306 similarly clocks selector 2901, again a positive-edge triggered D-flip-flop. Due to the 5 VCO clock cycle delay of waveform Q22 behind waveform Q21 (FIG. 31), selector 2901 samples and holds the response of phase detector 302 to VCO clock edges which are 5 VCO clock cycles behind the clock edges generating the responses held by selector 304.

Figure 32:
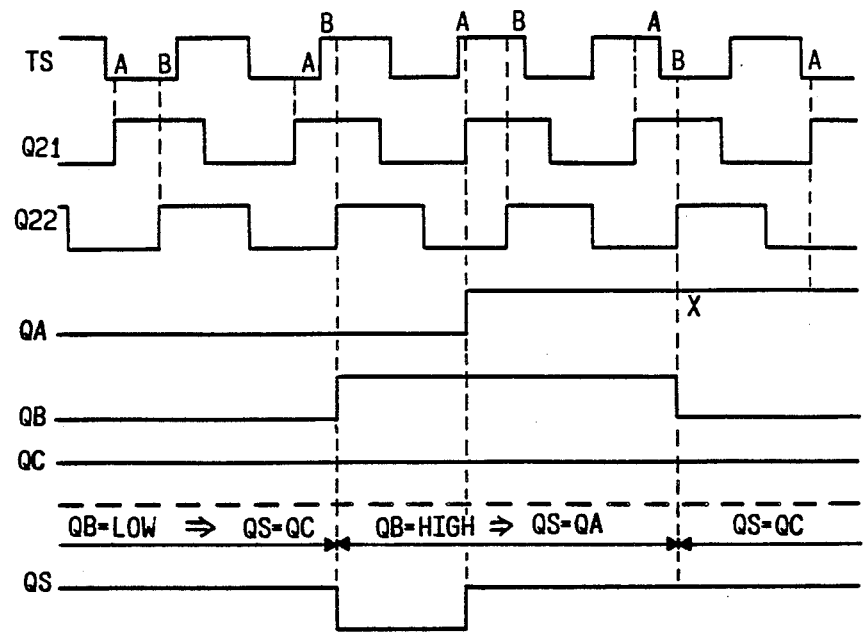
FIG. 32 is a set of timing diagrams depicting the operation of the structure of FIGS. 29 and 36 when the VCO frequency is lower than the bit-rate.

Assuming now that before the loop acquired lock, the VCO is running at a frequency equal to 80% of the incoming data rate. In FIG. 32, waveform TS represents the training sequence arriving from the transmitting side during lock acquisition as it appears retimed at the output of phase detector 302. Because the VCO is running at 80% of the incoming data rate, the frequency of waveforms Q21 and Q22 is also equal to 80% of the frequency of the incoming training sequence. (The amplitude of the phase modulation introduced by phase modulator 902 in FIG. 29a is only a few degrees of the VCO period. For the sake of simplicity, this modulation is not shown in FIGS. 32 to 35.) Points A and B on waveform TS represent the points of the output signal of phase detector 302 which are sampled and held by selectors 304 and 2901, respectively. These points coincide with the positive transitions in waveforms Q21 and Q22, respectively, because selectors 304 and 2901 are positive-edge triggered flip-flops. QA and QB represent the outputs of selectors 304 and 2901, respectively. These outputs change state when the value of a new sample point A or B differs from its respective predecessor.

Figure 33:
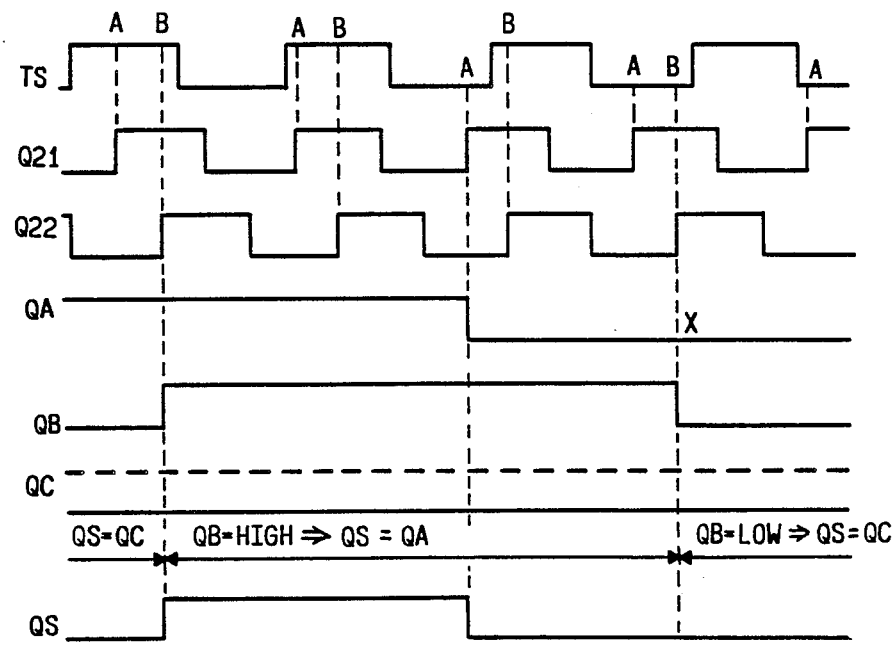
FIG. 33 is a set of timing diagrams depicting the operation of the structure of 29 and 36 when the VCO frequency is higher than the bit-rate.

FIG. 33 represents the same waveforms as FIG. 32 with the difference that here it is assumed that before lock acquisition the VCO is running at 120% of the incoming data rate. Therefore, waveforms Q21 and Q22 have a frequency equal to 120% of the retimed training sequence TS.

The operation of the frequency detector is based now on the fact that the level of waveform QA at the time of a transition of given polarity in waveform QB is a one-to-one indication of the sign of the VCO frequency error. For example, at the time of a negative transition in waveform QB, waveform QA is high when the VCO is running too slow (point X in FIG. 32) and low when the VCO is running too fast (point X in FIG. 33). As shown in FIG. 29a, this feature is utilized by using signal QB as a clock for negative edge-triggered D-flip-flop 2902 and by using signal QA as the D-input for flip-flop 2902. Consequently, output QC of flip-flop 2902 is continuously high when the VCO is running too slow and continuously low when the VCO is running too fast. Therefore, this output voltage is used to steer the VCO frequency toward the incoming data rate. However, the ultimate goal is to achieve not only a correct VCO frequency but also a locking in proper phase, as previously described. To achieve phase lock the VCO must be controlled by the response of phase detector 302 (FIG. 29a) to the selected clock edge, i.e. in FIG. 32 by points A sampled by selector 304 and held as its output QA. This would not happen if the VCO were continuously controlled by QC only. To achieve not only frequency lock but also phase lock, the phase detector must be given periodically a chance to act. As mentioned before, phase lock can occur only if the "selected" clock edge samples the close vicinity of the master transition in the training sequence, i.e. when points A are close to the positive transitions in TS. As seen in FIGS. 32 and 33, when samples A are close to the positive transitions in TS, points B are always on a high portion of TS. So the proper time to give phase locking a chance is when points B are high, i.e. when waveform QB is high.

This time sharing of VCO control between frequency and phase detector is implemented in the embodiment of FIG. 29a by feeding low pass filter 901 from an electronic switch 2903 (e.g. a multiplexer) controlled by QB (via OR gate 2904) which supplies as an input signal QS to low pass filter 901 alternately QA (when QB is high) and QC (when QB is low). Signal 2905 driving the second input of OR gate 2904 is assumed to be low for now. As shown in FIGS. 32 and 33, when QB is low, QS =QC; conversely, when QB is high, QS =QA. Examining signal QS in FIG. 32 shows that even when signal QC is chopped by electronic switch 2903, when the VCO frequency is too low, signal QS spends more time in high level than in low level (on average 75% vs. 25%). Conversely, if the VCO frequency is too high, the opposite is true (FIG. 33). Low pass filter 901 extracts the dc component of QS which, as signal QC would do, steers the VCO frequency in the proper direction. When QS is, on average, high, it increases the VCO frequency; conversely, when QS is, on average, low, it decreases the VCO frequency. This control action brings the VCO frequency close to the incoming data rate, allowing the phase detector to achieve lock. Of course, the VCO control sensitivity (change of frequency vs. change of control voltage) must be high enough for the high and low dc component of QS to tune the VCO from its respective worst-case center frequencies to the incoming data rate.

Figure 34:
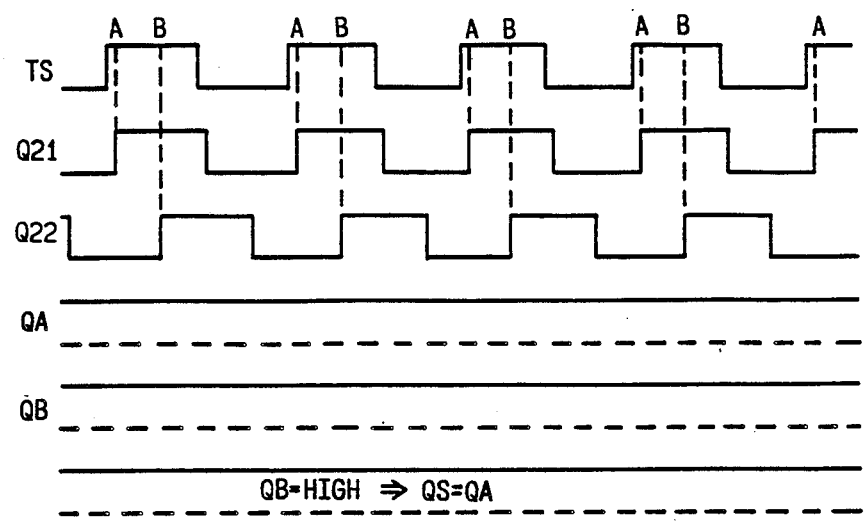
FIG. 34 is a set of timing diagrams depicting the operation of the structure of FIGS. 29 and 36 when the VCO frequency is equal to the bit-rate and the VCO phase is too late.

FIG. 34 depicts the situation when the above-described operation of the frequency detector succeeded to make the VCO frequency equal to the incoming data rate but the VCO clock edge selected by selector 304 is still somewhat delayed behind the master transition. Consequently both points A and B lie on the high portion of TS and both QA and QB are high. With QB high, low pass filter 901 is fed by QA via electronic switch 2903. QA, being high, increases the VCO frequency, which moves the selected clock edge towards the master transition. If the selected clock edge comes close enough to the master transition, the clock's phase modulation caused by phase modulator 902 makes QA quickly alternate between a high a low state with a duty cycle required to hold the VCO at the incoming data rate. Lock then occurs as described in the embodiment of FIG. 9.

Figure 35:
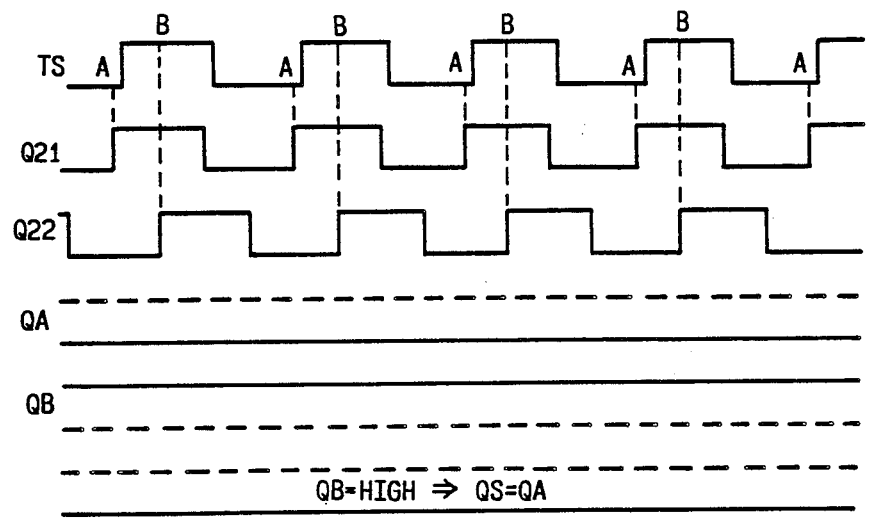
FIG. 35 is a set of timing diagrams depicting the operation of FIGS. 29 and 36 when the VCO frequency is equal to the bit-rate and the VCO phase is to early.

FIG. 35 depicts a similar situation as described with respect to FIG. 34, except that the selected VCO clock edge is assumed to occur too early, before the master transition. QB is still high, keeping QA in control of the VCO frequency. With point A lying on the low part of TS, QA is low and the VCO frequency is decreased. This moves the selected clock edge toward the master transition until the clock's phase modulation begins to control QA.

After lock acquisition has occurred (as described above) but before transmission of the training sequence is replaced by transmission of data, control signal 2905 in FIG. 29a is turned from a low level to a high level. The output of OR gate 2904 goes high and electronic switch 2903 feeds low pass filter 901 with QA regardless of the level of QB. This is necessary because when data transmission begins, the level of point B and thus of QB becomes data-dependent, while the VCO frequency is to be controlled by QA.

Figure 29B:
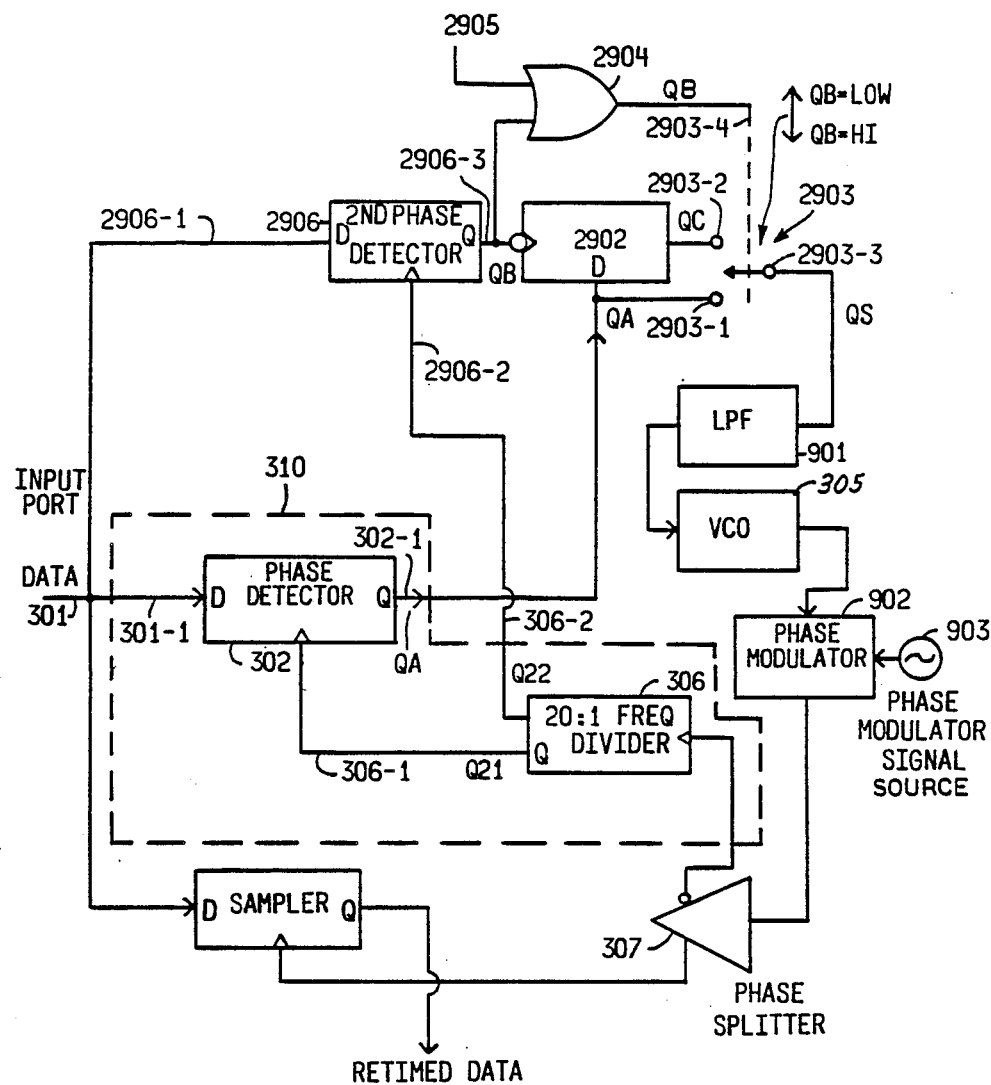

The above description of the frequency detector operation is based on adding the frequency detector to the embodiment of FIG. 9. FIG. 29b shows the addition of the frequency detector to a structure in which selector 304 is omitted and frequency divider 306 is inserted into the clock line of phase detector 302. Selector 2901 of FIG. 29a is replaced in FIG. 29b by a second phase detector 2906 which is clocked by output Q22 of frequency divider 306. The D-input of second phase detector 2906 receives the incoming data stream. The structure and operation of the frequency detector when added to other embodiments is analogous.

The addition of a frequency detector can also be made to the first embodiment so that a non-precision VCO can be used. In the first embodiment, phase detector clock phase modulation was achieved by alternating the VCO frequency between two values differing by a small fraction of the incoming data rate. In the numerical examples used for the first embodiment, the two values differed by 2 MHz with a 2GHz data rate (see FIGS. 5 and 6). The VCO frequency alternation followed the changes in selector 304 output voltage level with a transition time equal to a small fraction of the frame duration. There was no phase modulator and no low pass filter used in the first embodiment.

Figure 36:
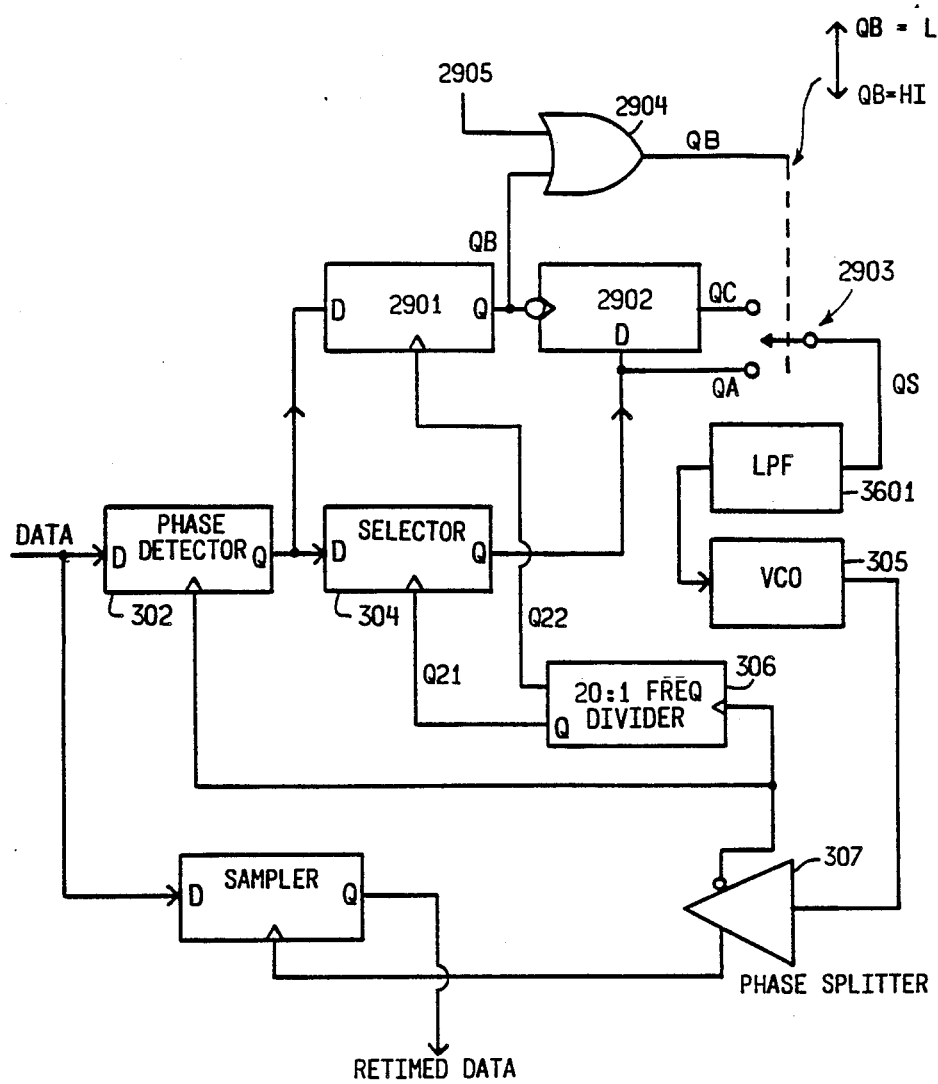
FIG. 36 is an alternative embodiment of this invention which includes a frequency detector.

An alternative embodiment based upon the first embodiment complemented by a frequency detector is shown in FIG. 36. This embodiment differs from the embodiment of FIG. 29a only by the omission of phase modulator 902 and phase modulator signal source 903. And, of course, as required in the first embodiment (but none of the others), the VCO must be able to change its frequency quickly with no phase discontinuities in its oscillation.

To make a non-precision VCO work in the first embodiment, two conditions have to be met. The first condition is that the VCO control voltage (i.e. as in the embodiment of FIG. 29a, the dc component of signal QS) is able to drive the VCO from its worst case center frequency to the incoming data rate. Using the previous example of a 2 GHz data rate and assuming a possible VCO center frequency ranging from 1.5 to 3 GHz, the DC component of QS must be able to tune the VCO over many hundreds of MHz. The second condition is that to achieve and maintain phase lock with a negligible phase error amplitude (see FIGS. 5 and 6) the VCO frequency must respond to high frequency (essentially frame-to-frame) alternations of QS level with only a small step in its frequency (2 MHz in the above example). This can be achieved by structuring low pass filter 3601 in the embodiment of FIG. 36 as a lag lead filter, as depicted in FIG. 37.

Figure 37:
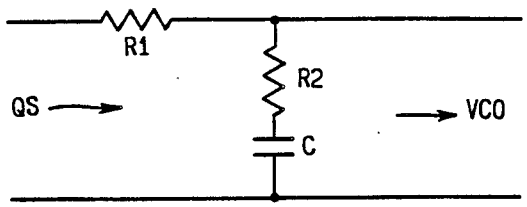
FIG. 37 depicts a lag-lead filter suitable for use as low pass filter 3601 of FIG. 36.

The dc component of signal QS is passed by the filter of FIG. 37 with no attenuation because capacitor C offers infinite impedance for dc. The dc component of QS has full control over the VCO frequency. The time constant R2 * C is chosen to be at least 5 to 10 times the frame duration. Therefore, the impedance of capacitor C for high frequency (frame-to-frame) alternations in QS level is negligible compared to R2. These high frequency alternations of QS level are passed by the filter attenuated to a fraction equal to R2/(R1+R2) of their voltage at the filter input. By proper choice of the filter components, the high frequency alternations of QS can be attenuated to the degree to cause only a much smaller step (2 MHz) in VCO frequency than the change (hundreds of MHz) caused by changes in the dc component of QS.

The structure in FIG. 36 can be again modified by omitting selector 304, replacing selector 2901 by a second phase detector 2906 and inserting frequency detector 306 into the clock line of phase detector 302 similarly to FIG. 29b. However, as in all structures omitting selector 304, the propagation delay of divider 306 from its clock input to its output clocking the first phase detector 302 must be negligibly small compared to the bit time interval or equal to an integer multiple of the bit time interval. Or, the propagation delay of the frequency divider 306 must be compensated by an element of matching and tracking propagation delay inserted into the clock line of sampler 303.

All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be practiced within the scope of the appended claim.

What is claimed:

1. A structure for extracting a bit clock, a frame clock, and data from a data stream comprising:
    an input port for receiving said data stream wherein:
    said data stream is grouped into consecutive frames of N bits, where N is an integer,
    each of said consecutive frames comprises at least two non-data bits, with two of said non-data bits being in consecutive bit positions and being of opposite logic values, the transition between said two non-data bits forming a master transition, said master transition being of the same polarity and located in the same position in each of said frames;
    said consecutive frames are grouped into one or more groups of frames; and
    an integral number of said consecutive frames at the beginning of each of said groups of frames constitute a training sequence comprising only said master transition and one transition of opposite polarity;
    an output port for providing extracted data;
    bit clock means for providing a bit clock signal which is adjusted in response to a binary clock control signal to match said data stream in frequency and phase;
    a clock control source comprising:
    an input lead connected to said input port;
    a frame clock means for generating a frame clock signal having a frequency equal to 1/N times the bit clock signal frequency as means for selecting one of every 2N-th transition in said bit clock signal; and
    an output lead supplying said binary clock control signal, said binary clock control signal changing its level at most once per frame, and having a first binary value when said selected bit clock transition occurred before said master transition and a second binary value when said selected bit clock transition occurred after said master transition, said binary clock control signal, when of said first binary value influencing said bit clock means to decrease the frequency of said bit clock and when of said second binary value influencing said bit clock means to increase the frequency of said bit clock; and
    sampler means having an input lead connected to receive said data stream, a clock input lead for receiving said bit clock signal, and an output lead for providing said extracted data on said output port.

2. A structure as in claim 1 wherein said clock control source further comprises a phase detector having an input lead connected to said input port, a clock input lead for receiving said frame clock signal, and an output lead for providing said binary clock control signal.

3. A structure as in claim 2 wherein said sampler means comprises a first D flip flop, and said phase detector comprises a second D flip flop which is closely matched to said first D flip flop.

4. A structure as in claim 1 wherein said clock control source further comprises:
    a phase detector having an input lead connected to said input port, a clock input lead for receiving said bit clock signal, and an output lead; and a selector means having an input lead connected to said output lead of said phase detector, a clock input lead for receiving said frame clock signal, and an output lead for providing said binary clock control signal.

5. A structure as in claim 4 wherein said sampler means comprises a first D flip flop, and said phase detector comprises a second D flip flop which is closely matched to said first D flip flop.

6. A structure as in claim 4 wherein said selector means comprises a D flip flop.

7. A structure as in claim 4 wherein: said selector means comprises:
a plurality of selection devices, each having an input lead, and output lead, and a clock input lead, said plurality of selection devices being connected in cascade with the input lead of the first of said selection devices serving as said input lead of said selector means and with the output lead of the last of said selection devices serving as said output lead of said selector means; and
a plurality of clock divider means, each having an input lead and an output lead, said plurality of clock divider means being connected in cascade with the input lead of the first clock divider means serving as said input lead of said frame clock means and with the output lead of the last clock divider means serving as said output lead of said frame clock means, each of said clock divider means providing an associated one of a plurality of divided clock signals, each of which is applied to the clock input lead of an associated one of said plurality of selection devices.

8. A structure as in claim 7 wherein said selection devices comprise D flip flops.

9. A structure as in claim 1 wherein said bit clock means comprises a voltage controlled oscillator.

10. A structure as in claim 1 wherein said clock control source receives said bit clock signal of a first phase and said sampler means receives said bit clock signal of a second phase.

11. A structure as in claim 10 wherein said first and second phases differ by approximately 180 degrees.

12. A structure as in claim 11 wherein said first and second phases have duty cycles of approximately 50%.

13. A structure as in claim 12 which further comprises a phase splitter having an input lead for receiving said bit clock signal, a first output lead for providing said bit clock signal of said first phase, and a second output lead for providing said bit clock signal of said second phase.

14. A structure as in claim 12 which further comprises:
a phase splitter having a first input lead for receiving said bit clock signal, a second input lead, a first output lead for providing said bit clock signal of said first phase, and a second output lead for providing said bit clock signal of said second phase;
differential amplifier means having a first input lead, a second input lead, and an output lead connected to said second input lead of said phase splitter;
a first low pass filter connected between said first output lead of said phase splitter and said first input lead of said differential amplifier means; and
a second low pass filter connected between said second output lead of said phase splitter and said second input lead of said differential amplifier means.

15. A structure as in claim 11 which further comprises a low pass filter for filtering said clock control signal.

16. A structure as in claim 15 which further comprises at least one phase modulator and a phase modulator signal source for controlling said at least one phase modulator.

17. A structure as in claim 16 wherein said phase modulator modulates said bit clock signal.

18. A structure as in claim 16 wherein said phase modulator modulates said first phase of said bit clock signal.

19. A structure as in claim 18 wherein said phase modulator is capable of modulating over a range centered at approximately 0 degrees.

20. A structure as in claim 17 wherein said first phase of said bit clock signal is provided by said phase modulator capable of modulating over a range centered at approximately 180 degrees.

21. A structure as in claim 16 which further comprises a first phase modulator which modulates said first phase of said bit clock signal, and a second phase modulator which modulates said second phase of said bit clock signal.

22. A structure as in claim 21 wherein said first and second phase modulators have substantially identical centers of modulating range.

23. A structure as in claim 22 which further comprises a low pass filter for filtering the signal from said phase modulator signal source before application to said second phase modulator.

24. A structure as in claim 16 wherein said phase modulator signal source comprises an integrator means having a first input lead connected to said input lead of said low pass filter, a second input lead connected to said output lead of said low pass filter, and an output lead connected to said at least one phase modulator.

25. A structure as in claim 18 which further comprises phase shift feedback means comprising:
a first input lead for receiving said bit clock signal of said first phase;
a second input lead for receiving said bit clock signal of said second phase; and
means for providing an output signal indicative of the difference in phase between said bit clock signals of first and second phase.

26. A structure as in claim 25 wherein said output signal indicative of the difference in phase between said bit clock signals of first and second phase serves as at least a portion of a phase modulator signal applied to said at least one phase modulator.

27. A structure as in claim 23 which further comprises phase shift feedback means comprising:
a first input lead for receiving said bit clock signal of said first phase;
a second input lead for receiving said bit clock signal of said second phase; and
means for providing an output signal indicative of the difference in phase between said bit clock signals of first and second phase.

28. A structure as in claim 27 wherein said output signal indicative of the difference in phase between said bit clock signals of first and second phase comprises at least a portion of a phase modulator signal applied to said second phase modulator.

29. A structure as in claim 15 which further comprises a frequency detector which serves to determine the sign of the difference between the frequency of said bit clock signal and the frequency of said data stream and cause said bit clock means to provide said bit clock signal having a frequency which is approximately equal to the frequency of said data stream.

30. A structure as in claim 29 wherein said frequency detector operates in response to a training sequence.

31. A structure as in claim 30 wherein said clock control source further comprises:
a first phase detector having an input lead connected to said input port, an output lead, and a clock input lead for receiving said frame clock signal as a means for selecting one of every 2N-th transition of said bit clock signal;
quadrature frame clock means for providing a quadrature frame clock signal having a frequency which is equal to the frequency of said frame clock signal but which is phase delayed from said frame clock signal by approximately a quarter of the period of said frame clock signal;
a second phase detector having an input lead connected to said input port, a clock input lead for receiving said quadrature frame clock signal, and an output lead for providing an output signal indicative of the logic level of said training sequence at a time specified by said quadrature frame clock signal;
a storage means having an input lead connected to the output lead of said first phase detector, a clock input lead connected to the output lead of said second phase detector, and an output lead for providing an output signal equal to the logic level of the output signal of said first phase detector at the time of a logic transition in the output signal of said second phase detector; and
switch means having a first input lead connected to said output lead of said first phase detector, a second input lead connected to said output lead of said storage means, a control input lead connected to said output lead of said second phase detector, and an output lead for providing said clock control signal, the signal on said control input lead causing said output lead of said switch means to be connected to said first input lead of said switch means when the logic level on said control input lead is of a first value and to be connected to said second input lead of said switch means when the logic level on said control input lead is of a second value.

32. A structure as in claim 31 wherein said output lead of said switch means is continuously connected to said first input lead of said switch means after lock has occurred but before the transmission of said training sequence is superseded by transmission of data.

33. A structure as in claim 30 wherein said clock control source further comprises:
a phase detector having an input lead connected to said input port, a clock input lead for receiving said bit clock signal, and an output lead;
first selector means having an input lead connected to said output lead of said phase detector, a clock input lead for receiving said frame clock signal as a means for selecting one of every 2N-th transition of said bit clock signal, and an output lead;
quadrature frame clock means for providing a quadrature frame clock signal having a frequency which is equal to the frequency of said frame clock signal but which is phase delayed from said frame clock signal by approximately a quarter of the period of said frame clock signal;
a second selector means having an input lead connected to said output lead of said phase detector, a clock input lead for receiving said quadrature frame clock signal, and an output lead for providing an output signal indicative of the logic level of said training sequence at a time specified by said quadrature frame clock signal;
a storage means having an input lead connected to said output lead of said first selector means, a clock input lead connected to said output lead of said second selector means, and an output lead for providing an output signal equal to the logic level of said output signal of said first selector means at the time of a logic transition in the output signal of said second selector means; and
switch means having a first input lead connected to said output lead of said first selector means, a second input lead connected to said output lead of said storage means, a control input lead connected to said output lead of said second selector means, and an output lead for providing said binary clock control signal, the signal on said control input lead causing said output lead of said switch means to be connected to said first input lead of said switch means when the logic level on said control input lead is of a first value and to be connected to said second input lead of said switch means when the logic level on said control input lead is of a second value.

34. A structure as in claim 33 wherein said output lead of said switch means is continuously connected to said first input lead of said switch means after lock has occurred but before the transmission of said training sequence is superseded by transmission of data.

35. A structure as in claim 20 wherein said low pass filter includes at least one pole and one zero.

* * * * *

UNITED STATES PATENT AND TRADEMARK OFFICE
CERTIFICATE OF CORRECTION

PATENT NO. : 4,926,447

DATED : May 15, 1990

INVENTOR(S) : Craig Corsetto, Tom Hornak, Rasmus Nordby, Rick C. Walker and Chu Yen It is certified that error appears in the above-identified patent and that said Letters Patent is hereby corrected as shown below:

Column 29, After line 21, add -- said frame clock means comprises: --

Signed and Sealed this

Fourth Day of May, 1993

Attest:

MICHAEL K. KIRK

*Attesting Officer*   *Acting Commissioner of Patents and Trademarks*